(12) United States Patent
Sabeti et al.

(10) Patent No.: US 10,830,295 B2
(45) Date of Patent: Nov. 10, 2020

(54) BRAKE DISC MOUNTING ARRANGEMENT

(71) Applicant: Bendix Spicer Foundation Brake LLC, Elyria, OH (US)

(72) Inventors: Manouchehr Sabeti, Avon, OH (US); James A. Seaman, Avon, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 153 days.

(21) Appl. No.: 16/041,252

(22) Filed: Jul. 20, 2018

(65) Prior Publication Data

US 2020/0025267 A1 Jan. 23, 2020

(51) Int. Cl.
*F16D 65/12* (2006.01)
*F16D 65/02* (2006.01)

(52) U.S. Cl.
CPC .... *F16D 65/123* (2013.01); *F16D 2065/1384* (2013.01); *F16D 2065/1392* (2013.01)

(58) Field of Classification Search
CPC .............................. F16D 65/123; F16D 65/128
USPC ............................. 188/218 XL, 18 A; 301/6.8
See application file for complete search history.

(56) References Cited

U.S. PATENT DOCUMENTS

| | | |
|---|---|---|
| 1,846,079 A | 2/1932 | Bellamore |
| 3,665,231 A | 5/1972 | Wendler |
| 3,951,241 A | 4/1976 | Baxendale |
| 4,466,503 A | 8/1984 | Hans et al. |
| 5,007,508 A | 4/1991 | Lacombe |
| 5,109,960 A | 5/1992 | Gunther |
| 5,190,124 A | 3/1993 | Haneda |
| 5,261,511 A | 11/1993 | Libsch et al. |
| 5,570,760 A | 11/1996 | Lai |
| 5,772,285 A | 6/1998 | Bigley et al. |
| 5,820,224 A | 10/1998 | Dimatteo, Jr. |

(Continued)

FOREIGN PATENT DOCUMENTS

| | | |
|---|---|---|
| CA | 2 289 833 A1 | 5/2001 |
| CN | 106641038 A | 5/2017 |

(Continued)

OTHER PUBLICATIONS

International Search Report (PCT/ISA/220 and PCT/ISA/210) issued in PCT Application No. PCT/US19/40281 dated Sep. 27, 2019 (three (3) pages).

(Continued)

*Primary Examiner* — Christopher P Schwartz
(74) *Attorney, Agent, or Firm* — Crowell & Moring LLP

(57) ABSTRACT

An arrangement and method for mounting a brake disc to an axle hub of a vehicle is provided. The arrangement includes wedge-shaped holes at an radially inner region of the brake disc, corresponding wedge-shaped key inserts, a retaining device such as a retaining ring, and mounting devices such as bolts or studs and nuts that pass through the retaining ring and keys to bias the keys against the axle hub. The circumferential sides of the wedge shapes are aligned with radial lines extending from the rotation axis of the axle hub. This arrangement and method provides a simple, robust and easily installed brake disc mounting that minimizes heat transfer between the brake disc and the axle hub and accommodates thermal expansion of the brake disc and the axle hub to minimize thermal expansion-induced stresses to the brake disc.

29 Claims, 24 Drawing Sheets

(56) References Cited

U.S. PATENT DOCUMENTS

| | | | |
|---|---|---|---|
| 6,076,896 | A | 6/2000 | Bertetti et al. |
| 6,116,700 | A | 9/2000 | Herrera |
| 6,138,811 | A | 10/2000 | Hashimoto et al. |
| 6,322,158 | B1 | 11/2001 | Herrera |
| 6,443,269 | B1 | 9/2002 | Rancourt |
| 6,446,765 | B1 | 9/2002 | Dabertrand et al. |
| 6,450,303 | B1 | 9/2002 | Keck et al. |
| 6,540,306 | B2 | 4/2003 | Kanehisa |
| 6,571,920 | B1 | 6/2003 | Sturmer et al. |
| 6,604,613 | B2 | 8/2003 | Burgoon et al. |
| 6,626,273 | B1 | 9/2003 | Baumgartner et al. |
| 6,696,014 | B2 | 2/2004 | Nakamura et al. |
| 6,880,897 | B2 | 4/2005 | Goss et al. |
| 6,957,726 | B2 | 10/2005 | Gehrs |
| 7,210,748 | B1 | 5/2007 | Velazquez et al. |
| 7,367,632 | B2 | 5/2008 | Chang |
| 7,410,036 | B2 | 8/2008 | Wimmer et al. |
| 7,624,662 | B1 | 12/2009 | Turos |
| 7,654,365 | B2 | 2/2010 | Lamb |
| 7,681,698 | B2 | 3/2010 | Gripemark et al. |
| 7,695,073 | B1 | 4/2010 | Chen |
| 7,909,412 | B2 | 3/2011 | Ashman |
| 7,934,777 | B1 | 5/2011 | Yuhas |
| 8,511,442 | B2 | 8/2013 | Mueller |
| 8,651,247 | B2 | 2/2014 | Burgoon et al. |
| 8,651,249 | B2 | 2/2014 | Lee |
| 8,772,993 | B2 | 7/2014 | Strohm et al. |
| 8,936,321 | B2 | 1/2015 | Re et al. |
| 8,950,556 | B2 | 2/2015 | Root |
| 8,967,339 | B2 | 3/2015 | Drewes |
| 9,249,848 | B2 | 2/2016 | Kokott |
| 9,267,560 | B2 | 2/2016 | Nakakura |
| 9,303,705 | B2 * | 4/2016 | Plantan ................ F16D 65/123 |
| 9,714,685 | B2 | 7/2017 | Root |
| 9,897,154 | B2 | 2/2018 | Root et al. |
| 10,527,116 | B2 | 1/2020 | Voigt et al. |
| D877,015 | S | 3/2020 | Chen et al. |
| 2003/0151300 | A1 | 8/2003 | Goss et al. |
| 2004/0178030 | A1 | 9/2004 | Pacchiana et al. |
| 2004/0182654 | A1 | 9/2004 | Chen |
| 2005/0173204 | A1 | 8/2005 | Baumgartner et al. |
| 2005/0205368 | A1 | 9/2005 | Gripemark et al. |
| 2006/0054422 | A1 | 3/2006 | Dimsey et al. |
| 2006/0108859 | A1 | 5/2006 | Mercat et al. |
| 2006/0219488 | A1 | 10/2006 | Chen |
| 2006/0284472 | A1 | 12/2006 | Chen |
| 2007/0158998 | A1 | 7/2007 | Aron |
| 2007/0240945 | A1 | 10/2007 | Hirotomi et al. |
| 2007/0284200 | A1 | 12/2007 | Hampton |
| 2008/0149435 | A1 | 6/2008 | Burgoon et al. |
| 2009/0020376 | A1 | 1/2009 | Masoni et al. |
| 2009/0160241 | A1 | 6/2009 | Baumann |
| 2009/0218183 | A1 | 9/2009 | Burgoon et al. |
| 2010/0276236 | A1 | 11/2010 | Kim et al. |
| 2011/0056777 | A1 | 3/2011 | Woychowski et al. |
| 2012/0085603 | A1 | 4/2012 | Mayer et al. |
| 2012/0132160 | A1 | 5/2012 | Malen et al. |
| 2012/0312646 | A1 | 12/2012 | Lee |
| 2013/0162011 | A1 | 6/2013 | Ruopp et al. |
| 2014/0000995 | A1 | 1/2014 | Hentrich et al. |
| 2014/0158486 | A1 | 6/2014 | Schorn et al. |
| 2014/0339027 | A1 | 11/2014 | Wurth et al. |
| 2014/0374200 | A1 | 12/2014 | Root |
| 2015/0034430 | A1 | 2/2015 | Nakakura |
| 2015/0047942 | A1 | 2/2015 | Kimes et al. |
| 2015/0053515 | A1 | 2/2015 | Drewes |
| 2015/0069818 | A1 | 3/2015 | Hester et al. |
| 2015/0345577 | A1 | 12/2015 | Watarai |
| 2016/0025165 | A1 | 1/2016 | Plantan et al. |
| 2016/0076613 | A1 | 3/2016 | Boffelli |
| 2016/0258500 | A1 * | 9/2016 | Sabeti ................ F16D 65/123 |
| 2016/0369363 | A1 | 12/2016 | Lee |
| 2017/0002878 | A1 | 1/2017 | Burgoon et al. |
| 2017/0030423 | A1 | 2/2017 | Comenduli et al. |
| 2017/0074335 | A1 | 3/2017 | Wagner |
| 2017/0074337 | A1 | 3/2017 | Borner et al. |
| 2017/0122391 | A1 * | 5/2017 | Pahle ................ F16D 65/123 |
| 2017/0138423 | A1 | 5/2017 | Kirkpatrick |
| 2017/0227077 | A1 | 8/2017 | Hammer |
| 2020/0025270 | A1 | 1/2020 | Sabeti et al. |
| 2020/0025271 | A1 | 1/2020 | Sabeti et al. |
| 2020/0180357 | A1 | 6/2020 | Wallmeier et al. |

FOREIGN PATENT DOCUMENTS

| | | |
|---|---|---|
| CN | 107202085 A | 9/2017 |
| DE | 44 19 754 A1 | 12/1995 |
| DE | 197 26 674 A1 | 1/1998 |
| DE | 102 50 231 A1 | 10/2003 |
| DE | 102 56 613 A1 | 8/2004 |
| DE | 103 23 310 A1 | 12/2004 |
| DE | 102 37 504 B4 | 11/2006 |
| DE | 10 2012 007 472 A1 | 10/2013 |
| EP | 0 403 799 A2 | 12/1990 |
| EP | 1 217 248 A1 | 6/2002 |
| EP | 1 375 953 A2 | 1/2004 |
| EP | 3 163 112 A1 | 5/2017 |
| GB | 2 400 894 A | 10/2004 |
| WO | WO 98/02672 A2 | 1/1998 |
| WO | WO 02/38979 A1 | 5/2002 |
| WO | WO 03/089802 A1 | 10/2003 |
| WO | WO 2010/063831 A1 | 6/2010 |
| WO | WO 2012/107068 A1 | 8/2012 |
| WO | WO 2013/149928 A1 | 10/2013 |
| WO | WO 2015/104121 A1 | 7/2015 |
| WO | WO 2015/154836 A1 | 10/2015 |
| WO | WO 2016/014950 A1 | 1/2016 |
| WO | WO 2017/168132 A1 | 10/2017 |
| WO | WO 2017/176702 A1 | 10/2017 |

OTHER PUBLICATIONS

Written Opinion (PCT/ISA/237) issued in PCT Application No. PCT/US19/40281 dated Sep. 27, 2019 (eight (8) pages).

International Search Report (PCT/ISA/220 and PCT/ISA/210) issued in PCT Application No. PCT/US19/40290 dated Sep. 27, 2019 (three (3) pages).

Written Opinion (PCT/ISA/237) issued in PCT Application No. PCT/US19/40290 dated Sep. 27, 2019 (five (5) pages).

U.S. Non-Final Office Action issued in U.S. Appl. No. 16/041,292 dated Nov. 7, 2019 (14 pages).

Cover page of EP 1 379 794 A0 published Jan. 14, 2004 (one (1) page).

Cover page of EP 3 092 135 A0 published Nov. 16, 2016 (one (1) page).

Cover page of EP 0 912 839 published May 6, 1999 (one (1) page).

International Search Report (PCT/ISA/210) issued in PCT Application No. PCT/US2019/40260 dated Sep. 20, 2019 (two (2) pages).

Written Opinion (PCT/ISA/220 & PCT/ISA/237) issued in PCT Application No. PCT/US2019/40260 dated Sep. 20, 2019 with English translation (10 pages).

International Search Report (PCT/ISA/220 and PCT/ISA/210) issued in PCT Application No. PCT/US19/40274 dated Nov. 6, 2019 (five (5) pages).

Written Opinion (PCT/ISA/237) issued in PCT Application No. PCT/US19/40274 dated Nov. 6, 2019 (nine (9) pages).

Office Action issued in counterpart U.S. Appl. No. 16/041,266 dated Nov. 20, 2019 (nine (9) pages).

U.S. Office Action issued in U.S. Appl. No. 16/041,292 dated Mar. 11, 2020 (11 pages).

U.S. Office Action issued in U.S. Appl. No. 16/041,266 dated Mar. 24, 2020 (11 pages).

U.S. Office Action issued in U.S. Appl. No. 16/041,281 dated Mar. 26, 2020 (19 pages).

U.S. Office Action issued in U.S. Appl. No. 16/151,122 dated Aug. 28, 2020 (eight (8) pages).

* cited by examiner

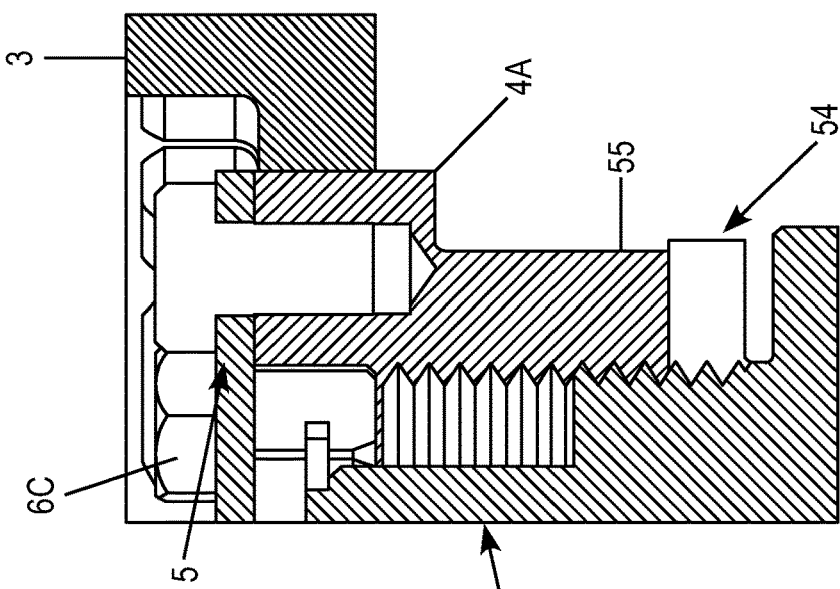
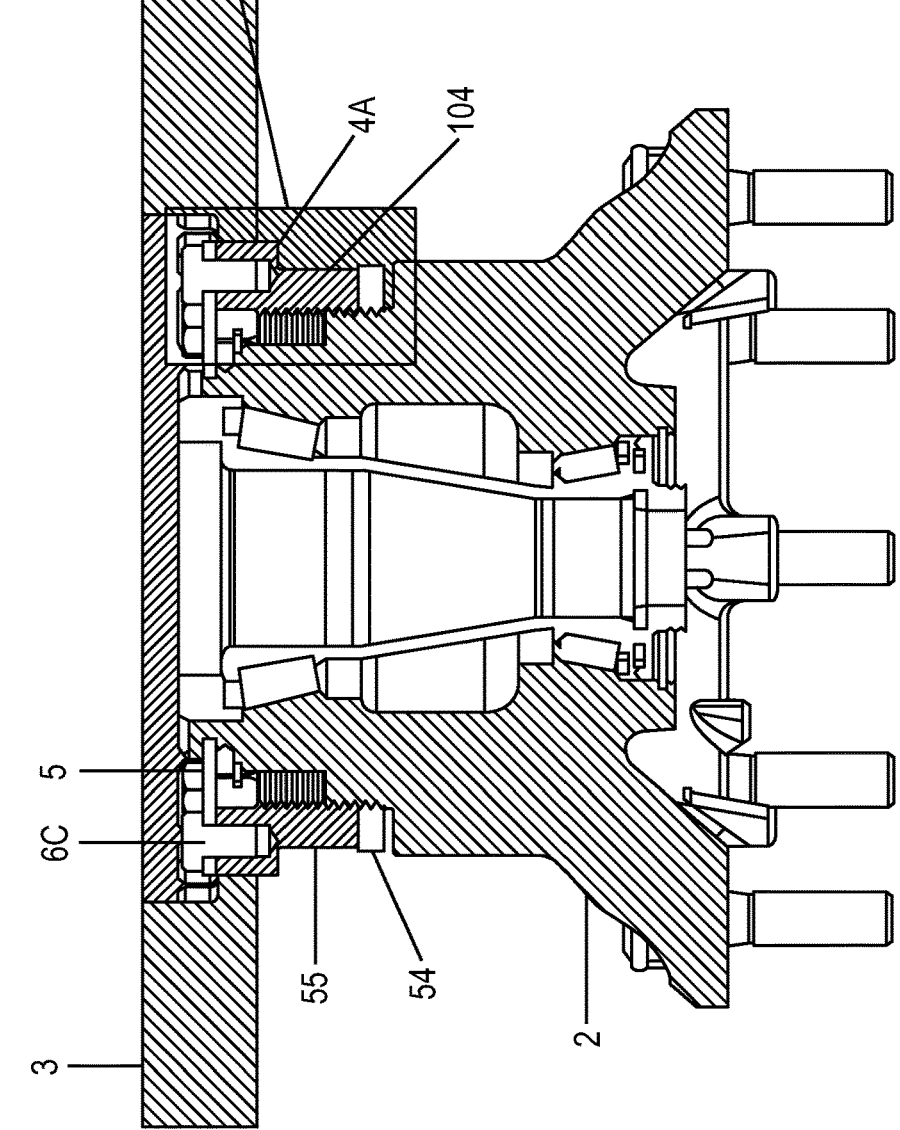
FIG. 12A
FIG. 12B

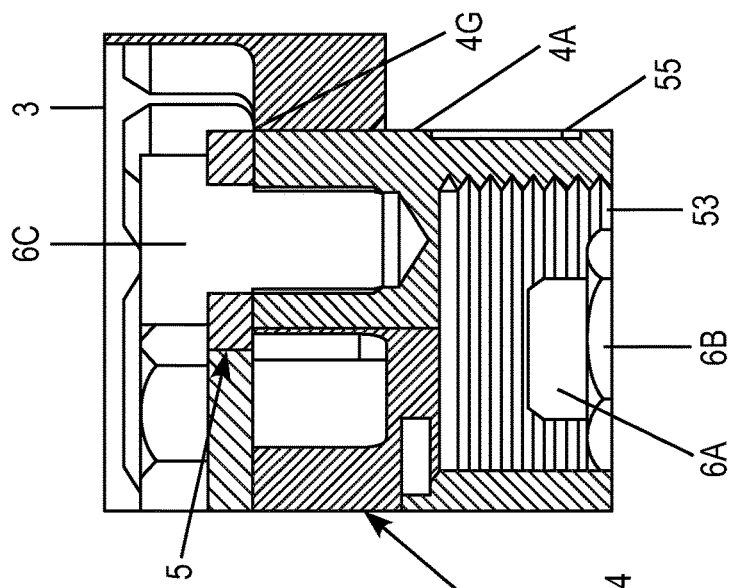
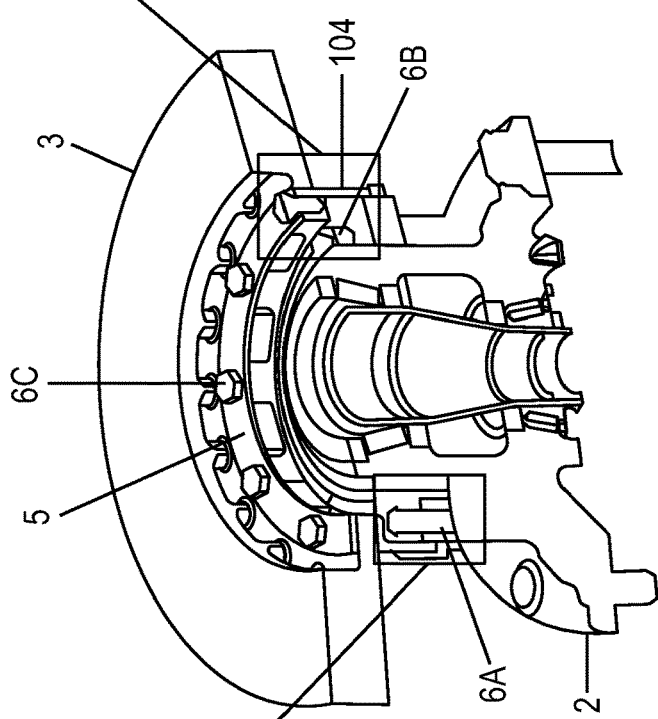
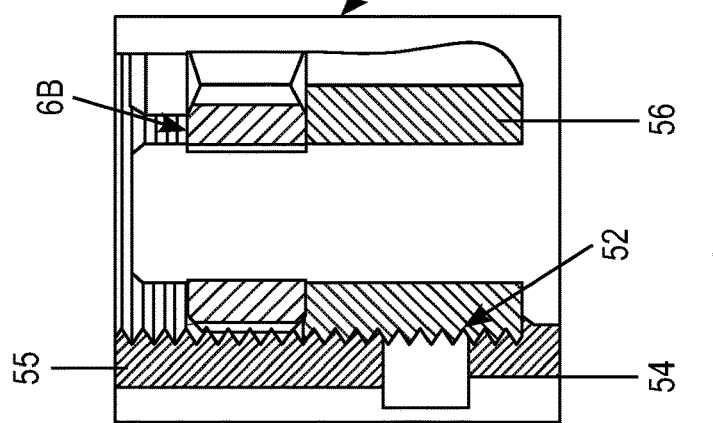
FIG. 14C
FIG. 14A
FIG. 14B

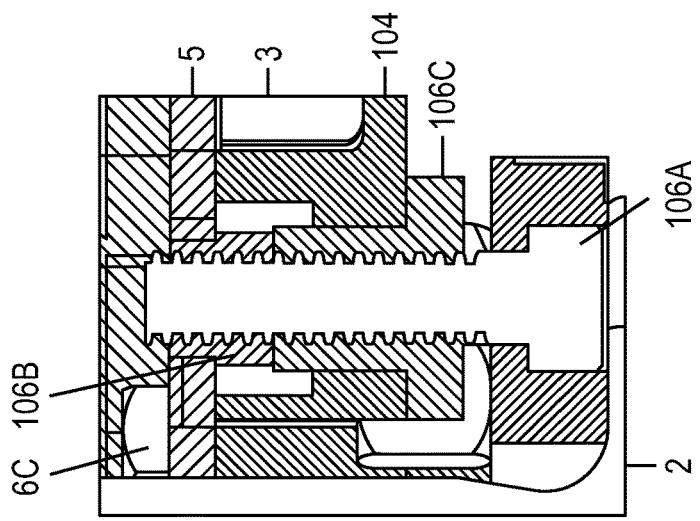
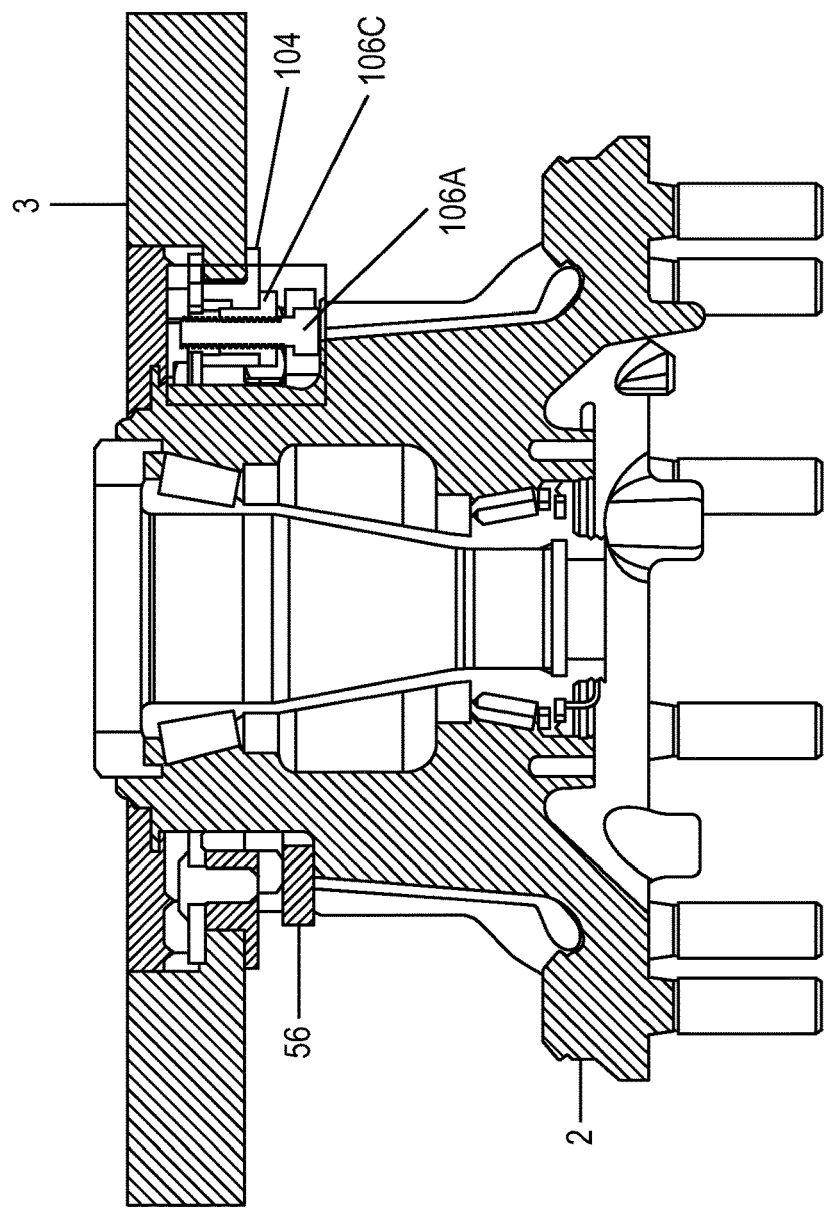
FIG. 17B
FIG. 17A

BRAKE DISC MOUNTING ARRANGEMENT

BACKGROUND AND SUMMARY OF THE INVENTION

The present invention relates to disc brakes for vehicles, and in particular to an arrangement for connecting and securing a brake disc to an axle hub, including axle hubs utilized on commercial vehicles such as tractor-trailer trucks, box trucks, buses, and the like. The invention also relates to a method for installation of a brake disc on an axle hub.

Disc brakes are increasingly being used on commercial vehicles, replacing conventional drum brakes. Very high braking energy is generated when the disc brake's caliper applies the brake pads to the brake disc to slow such heavy vehicles. In order to deal with such loads, very robust and often complicated designs have been required to connect the brake disc of a disc brake to an axle hub to transfer the braking forces from the brake disc to the hub. The design of the brake disc-to-hub connection is further complicated by the heat generated during braking as the kinetic energy of the vehicle is converted into heat energy by application of the brake pads to the brake disc. The heat the hub receives from the brake disc can be detrimental to the axle hub and its components (such as bearings and seals), as well as causing high component stresses due to differences in thermal expansion between different materials (for example, between an aluminum hub and a steel brake disc). The high heat can also cause brake fade and contribute to premature failure of braking components.

Commercial vehicle brake discs, also referred to as "brake rotors" or "rotors," often are mounted onto axle hubs using so-called spline arrangements using a fixed or floating connection, such as taught in U.S. Pat. Nos. 6,626,273 and 7,410,036. One example a semi-floating connection is the Splined Disc® brake assembly from Bendix Spicer Foundation Brake LLC. These types of brakes typically are mounted on an axle hub having a plurality of axially-oriented splines arranged around an outer circumference of a disc-mounting region of the hub. The brake disc has corresponding radially-inward facing tabs about the inner circumference of the brake disc. The disc is mounted to the axle hub by axially sliding the brake disc onto the hub's mating splines, followed by insertion and/or attachment of a variety of fasteners, brackets, etc., as necessary per the particular splined disc's design in order to secure the brake disc against axial movement off of the hub. When so mounted, the brake disc's tabs engage the hub's splines in a manner which permits the very large braking forces generated by the disc brake to be transferred to the axle hub and hence to the axle to slow the vehicle. This often requires costly precision machining of the spline/tab engagement surfaces.

Splined discs typically have had substantial metal-to-metal contact between the inner radial tabs of the brake disc and either the faces of the axle hub splines or intermediary inserts that are used to transfer the braking loads from the disc tabs to the hub splines. The intermediate inserts are used in conjunction with hub axial stop to axially restrain the brake disc on the axle hub. This metal-to-metal contact has the disadvantage of facilitating transfer of a large amount of brake heat from the brake disc directly to the axle hub. This is a particular problem where the axle hub is formed from aluminum, a material which is being more frequently used for axle hubs in order to minimize vehicle weight and improve fuel economy, both because the material properties of aluminum (e.g., strength) are known to degrade at higher temperatures, and because the aluminum of the axle hub and the material of the brake disc (typically cast iron) can have significantly different thermal expansion coefficients.

Other brake disc mounting arrangements are known which fix the brake disc to a hub or only allow limited relative movement between the brake disc and the hub. Such arrangements can inhibit the radial expansion of the brake disc, hub and connecting elements, leading to problems such as brake disc deformation (for example, "coning" of the brake disc, in which the friction surfaces of the brake disc bend out of a plane perpendicular to the axle hub's rotation axis). Such deformations can decrease brake disc and brake pad life, and cause brake disc "cracking" due to deformation-induced tensile stress.

Prior art brake disc mounting approaches have also had the problem of requiring complex and costly assemblies of shims and/or springs at the hub/disc interface to flexibly take up component clearances provided between the brake components to accommodate differential thermal expansion and wear- and noise-inducing vibrations. Further, the need to provide disc-to-hub joints that are robust enough to be able to withstand very high temperatures during braking events and metal fatigue over the extended life of a brake disc has required the use of brake discs with undesirably high mass and/or complexity and cost, such as the forming (typically by casting) of a tough material such as ductile iron over the grey iron of the brake disc in the hub region of the disc.

There exists a need for a brake disc mounting arrangement which substantially reduces or eliminates altogether the need for complex shim and or spring assemblies, is simple to assemble, can withstand high heat loads with as low a thermal mass as possible, resists brake disc deformation and uneven brake disc and brake pad wear due to differential heat-generated disc coning, is able to accommodate free radial thermal expansion with little or no binding between the brake disc and hub, and provides a fatigue life which exceeds the design life of the brake disc.

In order to address these and other problems with brake disc mounting in the prior art, the present invention provides a brake disc having a hub region geometry which accommodates differential radial growth of the axle hub and the brake disc, minimizes the number of, or eliminates entirely, the need for individual intermediary disc-to-hub elements, is simple to assemble and disassemble during installation and/or replacement of the brake disc, minimizes the impacts of torsional vibrations without the need for an additional vibration damping mechanism, and is cost effective.

In one embodiment of the invention a brake disc is provided with a plurality of transverse wedge-shaped slots about an inner circumference of the brake disc which are formed with a specific geometry which substantially reduces the stresses in the radially-inward-facing disc teeth between the wedge-shaped slots.

The brake disc slots are radially positioned in locations corresponding to brake disc mounting studs provided on an axle hub. The brake disc and the hub are connected to one another by wedge-shaped elements (aka "keys") that are positioned in corresponding transverse wedge-shaped slots or holes in a radially inner region of the brake disc, preferably with a retaining device that captures the portions of the brake disc between adjacent keys against axial movement away from the axle hub. The brake disc's wedge-shaped slots may be open on the radially inward side of the slot, or may be closed on the radially inward side, forming generally key-shaped holes at the inner radius of the brake disc.

The keys are provided with an aperture that can pass over a respective brake disc mounting stud, and with side surfaces that conform to the inner surfaces of the wedge-shaped brake disc holes. The keys may be formed from any material that can withstand the forces and temperatures encountered during braking events in this region of the hub and brake disc, and preferably from a material which is corrosion-resistant in the harsh environment of an axle hub.

Preferably, the contact surfaces between the lateral sides of the keys and the lateral sides of the wedge-shaped slots are sized large enough that, given the selected key and brake disc materials, contact surface deformation and wear are minimized to the point that intermediate shims, springs or other contact surface-protecting devices are not needed, i.e., such that the materials and geometry of the keys and the brake disc permit direct key-to-wedge-shaped slot contact without intermediate devices such as spacers and/or spring elements while still providing a long service life without premature wear or damage to the key and slot contact surfaces. The precise design of the geometry of the complementary keys and wedge-shaped slots also permits elimination of the use of intermediate vibration damping devices between the keys and the wedge-shaped slots, as the inherent rigidity of the present invention's "gap-driven design" ensures the resonance frequency of the assembly is relatively high (for example, above 200 Hz) and therefore out of the range of the natural frequencies of the vehicle's wheel-end components (natural frequency being a function of mass and stiffness of the components).

Preferably the sides of the wedge-shaped keys and their respective brake disc holes have their circumferential sides (the sides between their radially inner and radially outer sides that are approximately parallel to the hub rotation axis), generally aligned in the direction of radii extending from the hub rotation axis. Arranging the key and hole sides in this manner facilitates cooperative movement of the keys in their holes during simultaneous thermal expansion of the hub and the brake disc, thereby minimizing the potential for jamming between the keys and the brake disc and resulting thermally-induced stresses in the hub/disc system. Other geometries are possible as the wedge geometry is a function of the thermal mass of the rotor (the heat source) and the vane structure (dissipating heat).

Preferably, the sides of the wedge-shaped slots and the keys are arranged with an angle relative to the radii in the range of 12° to 20°, more preferably 16°. As compared to conventional brake discs with parallel slot sides (aka "straight teeth"), a brake disc having slot side angles in the preferable range surprisingly has a stress distribution around the circumference of the disc's inner hub attachment region during it braking event which is substantially more equally distributed between the inward-projecting disc teeth than in a brake disc with straight teeth.

It is known in the art that when brake pads are applied to a brake disc during a braking event, the pad's clamping forces are applied over a limited arc of the friction surfaces of the disc. As a result, the amount of the braking load sustained by the individual teeth varies with the number and circumferential position of the teeth about the hub. For example, in a brake disc with ten straight teeth, the tooth carrying the highest load may be carrying 10 times as much load as a diagonally-opposite tooth. A brake disc with ten wedge-shaped slots in the preferred slot-side angle range instead may see maximum-to-minimum load difference ratios of less than 3:1. The much more even sharing of the braking force loading among the brake disc mounting interface has several benefits, including lower maximum stress levels, reduced contact surface wear and longer component life, and the ability to design smaller brake disc interfaces which have less contact area for heat transfer from the brake disc to the hub.

Preferably, the keys are sized in the axial direction such that they are firmly biased against the hub at all times. The holes in keys through which fasteners pass preferably are sized near the size of the outer diameter of the fastener in order to maximize the load-bearing surface contact between the keys and the fasteners.

The present brake disc mounting arrangement is particularly simple and easy to install and/or replace. An embodiment of a method of installation includes locating a brake disc on an axle hub with the brake disc's wedge-shaped holes aligned with the hub's mounting studs or fastener-receiving holes, inserting corresponding wedge-shaped keys into the brake disc's wedge-shaped holes, placing a bolting ring over the keys, and installing fasteners that bias the keys against the hub. The keys allow the rotor to be piloted on the hub. Other variations are possible, for example, the keys may be located in the brake disc holes before the brake disc is located on the axle hub, or the fasteners may be fed through the keys before the keys are located in their respective brake disc holes.

The present invention further has the commercially significant advantage of providing the ability to readily adapt different brake disc designs from various brake component manufacturers to mount the brake discs on any standard flat-faced axle hub from various axle hub manufacturers.

There are multiple axle hub designs in the market, each with an associated component for supporting a brake caliper known as a "torque plate." The torque plate typically defines, in a restrictive manner, the location of the brake caliper and its carrier relative to the hub. The brake caliper and carrier design in turn defines the axial location of the brake disc rotor, which must be located between the brake pads on which the brake caliper's brake applications devices act to apply the brake. The axial location of the brake disc can be a critical parameter. The tight clearances in a commercial vehicle wheel hub region raises concerns for maintaining adequate clearance to wheel valve stems to avoid impacts which could shear off a valve stem and cause sudden tire deflation. The tight spaces also raise concerns with the brake actuator not being misaligned to the point of hitting the frame and accidentally releasing a parking brake.

Due to the variety in proprietary brake component designs, there is no "universal" brake disc in the commercial vehicle market which may be mounted directly to all, or even most, axle hubs (due to, for example, different bolt patterns) and which will be assured of being in the correct axial location for caliper fitment in different brake designs.

The present invention provides the opportunity to provide a brake disc mounting arrangement compatible with a universal or near-universal brake disc by providing appropriately-dimensioned key rings that correctly mate a brake disc with the present invention's key-receiving slots with a particular combination of axle hub and brake caliper designs. For example, in many applications one or more manufacturers may supply components for a wheel end that includes a particular model of an axle hub, a particular model of a torque plate, a particular model of a brake caliper, and a particular model of a brake disc with a mounting fastener pattern and axial offset to suit that unique combination of components. When it is time to replace the brake disc, rather than being required to use a proprietary brake disc, the a standardized (and thus lower cost) brake disc with an appropriate key-receiving slot arrangements may be adapted to the particular brake application. Such a standardized brake disc may be mounted to the particular axle hub using an intermediate key ring adapter that is dimensioned with mounting pattern that is compatible with the particular hub's mounting stud pattern (i.e., a particular pattern of stud holes at a particular mounting hole ring radius). The associated key ring would be provided with an appropriate thickness to ensure the standardized brake disc is properly axially aligned with the particular model of brake caliper (which in turn is axially located by the particular model of torque plate). The axial offset of the brake disc from the face of the particular model of axle hub may be readily set by making the key ring's webs between adjacent keys the appropriate thickness that results in the brake disc being correctly positioned between the caliper's brake pads when the brake disc abutting the key ring webs. In other embodiments, the brake disc and/or the key ring webs may be provided with more than one axial height, such that by rotation of the brake disc relative to the ring during installation, different axial positions of the brake disc relative to the torque plate may be obtained.

In the prior art there are known to be hundreds of combinations of torque plate, hub, brake caliper and brake rotors and associated offsets. The use of a limited number of standardized brake discs with appropriate key ring adapters would enable significant cost savings from simplified and more efficient brake disc manufacture (lower tooling costs and cost efficiencies from greater production volume as compared to more limited production of individual proprietary brake disc designs), simplified product logistics (fewer part numbers to administer and maintain in inventory, and greater availability to immediately fulfill a parts order); and simplified and less costly service needs (less technician time to determine what parts are required for a particular brake service and to complete the service).

Preferably, the key ring is formed from a powdered metal, which offers several advantages over aluminum and other materials such as steel alloys.

This approach reflects a substantial departure from the prior art.

In the prior art the conventional wisdom has been that costly materials with higher elongation and higher yield strength properties had to be used in an application such as the present invention, in order to increase fatigue life and otherwise provide sufficient resilience to survive the high temperature, high vibration, high applied force environment of a commercial vehicle disc brake.

Counter to this conventional belief, the inventors have deliberately selected a more brittle material with a low range of elongation, applying the material in a highly targeted manner, such as varying the powdered metal's density in different regions of a key ring to provide higher strength only in regions where needed. The use of a more brittle material is further aided in applications with the above-described key-and-slot arrangements, as the lower peak stresses experienced by the brake disc during a braking event provides additional design margin, i.e., lowers the stress levels the powdered metal must be able to withstand.

Powdered metal component properties are highly dependent on the process and equipment used to form the component, where the properties of the material of the component are functions of surface area, press force, material alloy composition, and the combination of the shaping of the component mold and the distribution of the powdered metal within the mold prior to compacting. For example, when a powdered metal alloy composition of FLC-4805-100HT per MPIF Standard 35 is subjected to compression in a 750 ton press, a targeted density on the order of 7 grams/$cm^3$ may be obtained in a key ring with a surface area of 115 $cm^2$. In a specific example of a particular key ring (i.e., without limiting the present invention to the specific numerical values that follow), the powdered metal may have a targeted range of material densities on the order 6.9 gr/$cm^3$-7.2 gr/$cm^3$, with the density made higher in critical areas, such as at a radius between a key and inter-key web (i.e., in a stress concentration region). At a post-formation density of 6.8-7.0 gr/$cm^3$, the local yield strength will be on the order of 725-760 MPa in the high-stress root region, which is substantially higher that the maximum loading expected in this particular key ring (560 MPa).

The use of variable-density powdered metal as a brake disc-to-axle hub adapter material provides many advantages, and frees designers from the prior art's material constraints. With targeted powdered metal design, designers may now develop adapter designs in which the engineering requirements (e.g., strength, fatigue life, fracture toughness) can be met while meeting other priority demands such as lower cost and weight.

A powdered metal key ring in accordance with the present invention can be expected to be lighter than a key ring formed from a steel alloy that can meet the same strength requirements. This represents the potential for substantial savings in weight at each axle end (contributing to improved fuel economy and consequently lower emissions), as well as savings in cost from avoiding use of high-cost alloy steel materials and difficult machining operations.

The powdered metal key ring of the present invention also avoids the problems of some conventional lighter-weight materials. For example, it is well known that at higher temperatures (temperatures obtainable in a heavy braking environment) aluminum loses a significant portion of its strength. As a result, components formed from aluminum must be designed accordingly, which typically resulting in much larger components to lower the local stresses to a survivable range (and thereby negating much of aluminum's weight advantage). In contrast, powdered metal's material properties are significantly less temperature dependent over large temperature ranges; indeed, powdered metal sintering temperatures are far above any temperature likely to encountered in a braking environment. Powdered metal components may also be designed to be substantially smaller than corresponding aluminum components, as powdered metal is typically on the order of five times stronger than aluminum.

From a thermal isolation standpoint, a powdered metal key ring may provide further "downstream" benefits. For example, because powdered metal is a good thermal isolator, the amount of heat transferred from the brake disc to the axle hub through the key ring may be lower than the amount of heat that would be otherwise transferred in a conventional brake disc mounting arrangement. This in turn may translate into the ability to use aluminum as the axle hub material in place of heavy iron or costly steel, because the aluminum hub would be less likely to see temperatures high enough to unacceptably reduce the strength of the aluminum. A further benefit may be significantly reduced temperatures at the bearings on which the hub rotates.

The benefits of the thermal isolation capabilities of a powdered metal brake disc key ring adapter are exemplified by a comparison with prior art brake disc designs. In the prior art, in order to prevent temperatures in the material of a flat-faced axle hub from exceeding design limits, a common solution was the so-called "U-shaped" brake disc, i.e., a brake disc having friction discs (the region of the highest temperature during a braking event) that are held axially well away from the face of the axle hub by a "hat" or bucket-shaped flange section (in cross-section, U-shaped sections). To the knowledge of the inventors, the use of a key ring adapter formed from variable-density powdered metal, particularly use such an adapter with the stress-equalizing geometries discussed above, has resulted in the first practical, cost-efficient design that can provide thermal isolation comparable to a U-shaped brake disc. In one example, the present key ring adapter approach resulted in temperatures at the bearings of an axle hub on the order of 50° C., well below a design target of 60° C., and far below the temperatures on the order of 80-90° C. with a prior flat rotor attachment approach.

Powdered metal also has advantages in lower cost and simpler component manufacturing operations. Powdered metal components are formed in "net shape" or "near net-shape" processes, primarily by high-pressure, and optionally high temperature, pressing in molds. When the components are removed from the molds they are in a near-finished state, thus avoiding costly, intricate machining such as that required of raw, unfinished forged component cores.

The powdered metal key ring in accordance with the present invention also provides related advantages during initial installation and subsequent replacement of brake discs. A large fraction of the prior art brake disc mounting arrangements require the use of additional small parts, from simple to complex combinations, to secure and/or prevent transfer of vibration energy between the brake disc and the axle hub and vice-versa. These spring and/or shim components add cost to the brake design, and require additional technician effort and time (with its related labor costs) to complete disassembly and reassembly of these components during a brake disc replacement job. All of this costly hardware and labor is eliminated by present invention, where the key ring adapter may be placed directly on the hub face, the brake disc placed on the key ring, with a simple cover ring capturing the brake disc on the key ring.

The scope of the present invention further includes alternative embodiments which similarly permit a "universal" or common rotor to be fitted to existing hubs while flexibly being able to accommodate different brake disc or rotor axial positions. For example, an inner surface of the key ring and/or a axial collar of the key ring may be provided with internal threads configured to engage corresponding external threads on an axial surface of a hub. Coupled with a relatively thin locknut also threaded onto the hub's external threads, the key ring could be rotated to a desired axial position and then locked into place by tightening the locknut against an axial face of the key ring. In addition to providing essentially unlimited positioning variability in the axial range of the overlapping threads, this arrangement may provide a particularly axially-narrow brake disc mounting solution.

Alternatively, for existing designs in which the hub is not equipped with external threads, an externally-threaded adapter base may be secured to the face of the hub using the hubs existing fasteners (e.g., studs and nuts or bolts that screw into bores of the hub). A locknut and an internally-threaded intermediate key ring as the previous embodiment may then be installed in the same manner on the adapter bases external threads.

A further embodiment may have the axial height adjustment capability of the present invention embodied in a manner that does not require either the hub or an adapter base and the key ring to have corresponding internal and external threads. For example, an adapter base without threads may receive leadscrews that axially project toward the key ring, which in turn receive threaded collars. The collars may be configured to axially receive the key ring, with the axial position of the key ring being adjustable by rotating the threaded collars along the leadscrews until the desired axial position is reached. The threaded collars may then be locked into place, for example by using jam nuts threaded onto the remaining projecting threads of the leadscrews.

Other objects, advantages and novel features of the present invention will become apparent from the following detailed description of the invention when considered in conjunction with the accompanying drawings.

BRIEF DESCRIPTION OF THE DRAWINGS

FIGS. 12A-12B are cross-section views of the brake disc arrangement of FIGS. 11A-11B.

FIGS. 14A-14C are cross-section views of the brake disc arrangement of FIGS. 13A-13B.

FIGS. 17A-17B are cross-section views of the brake disc arrangement of FIG. 15.

Common reference label numbers are used with common features in the figures.

DETAILED DESCRIPTION OF THE DRAWINGS

Figure 1A:
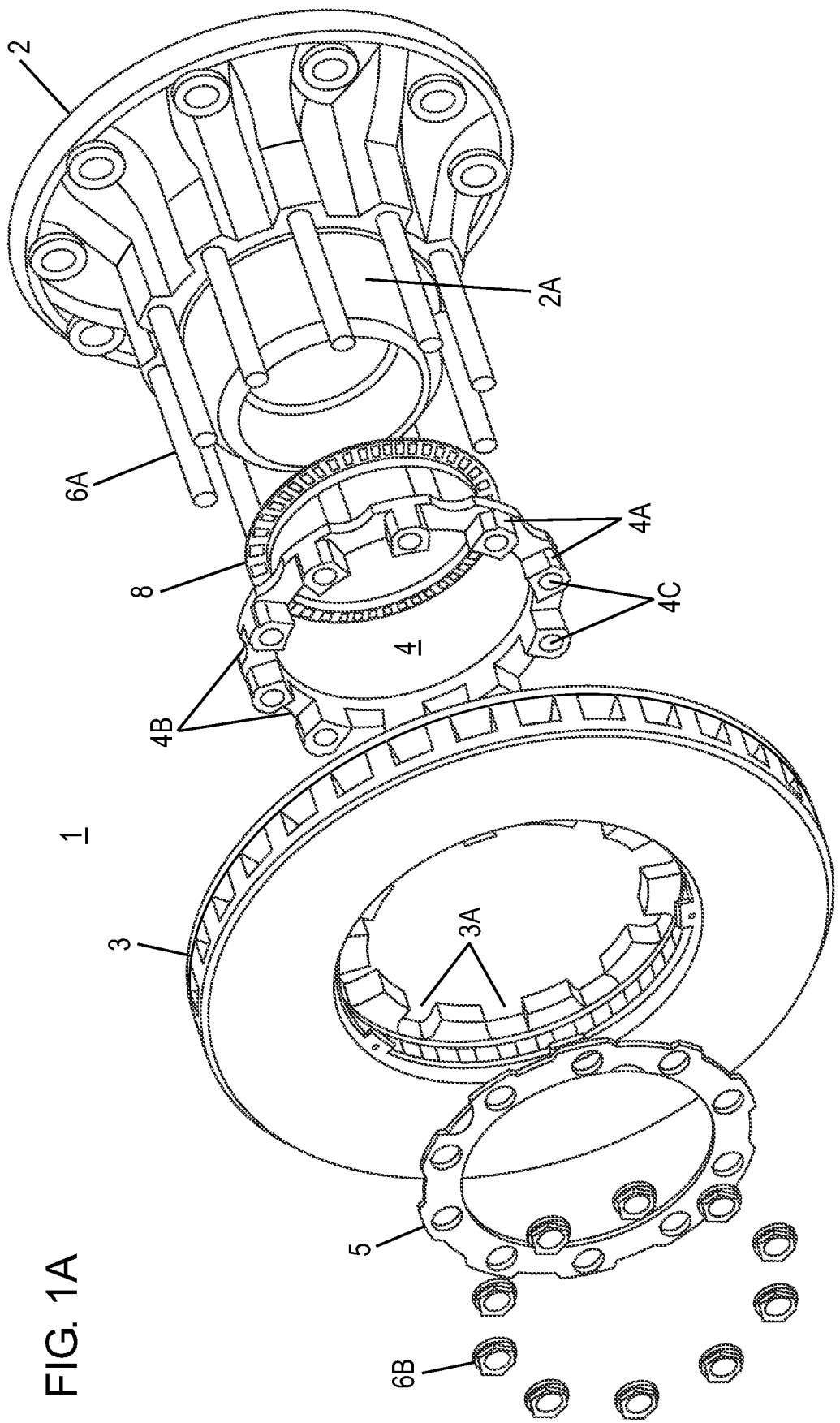
FIG. 1A is an oblique expanded view of a brake disc mounting arrangement in accordance with an embodiment of the present invention.

FIG. 1A is an exploded view of a brake disc mounting embodiment 1 including a rotating axle hub 2 located on an end of a vehicle axle (not illustrated), a brake disc 3, a ring 4 of wedge-shaped keys 4A connected by inner-key webs 4B, a retaining ring 5 and brake disc retaining studs 6A and corresponding retaining members, nuts 6B. The retaining ring alternatively may be separate washers, spring clips, or similar devices for each mounting location, as long as they do not interfere with the hub or rotor. The corresponding retaining members may be other than the nuts 6B, for example as clips or split pins, as long as the retaining members maintain a biasing force to bias the keys 4A against the axle hub 2.

Figure 1B:
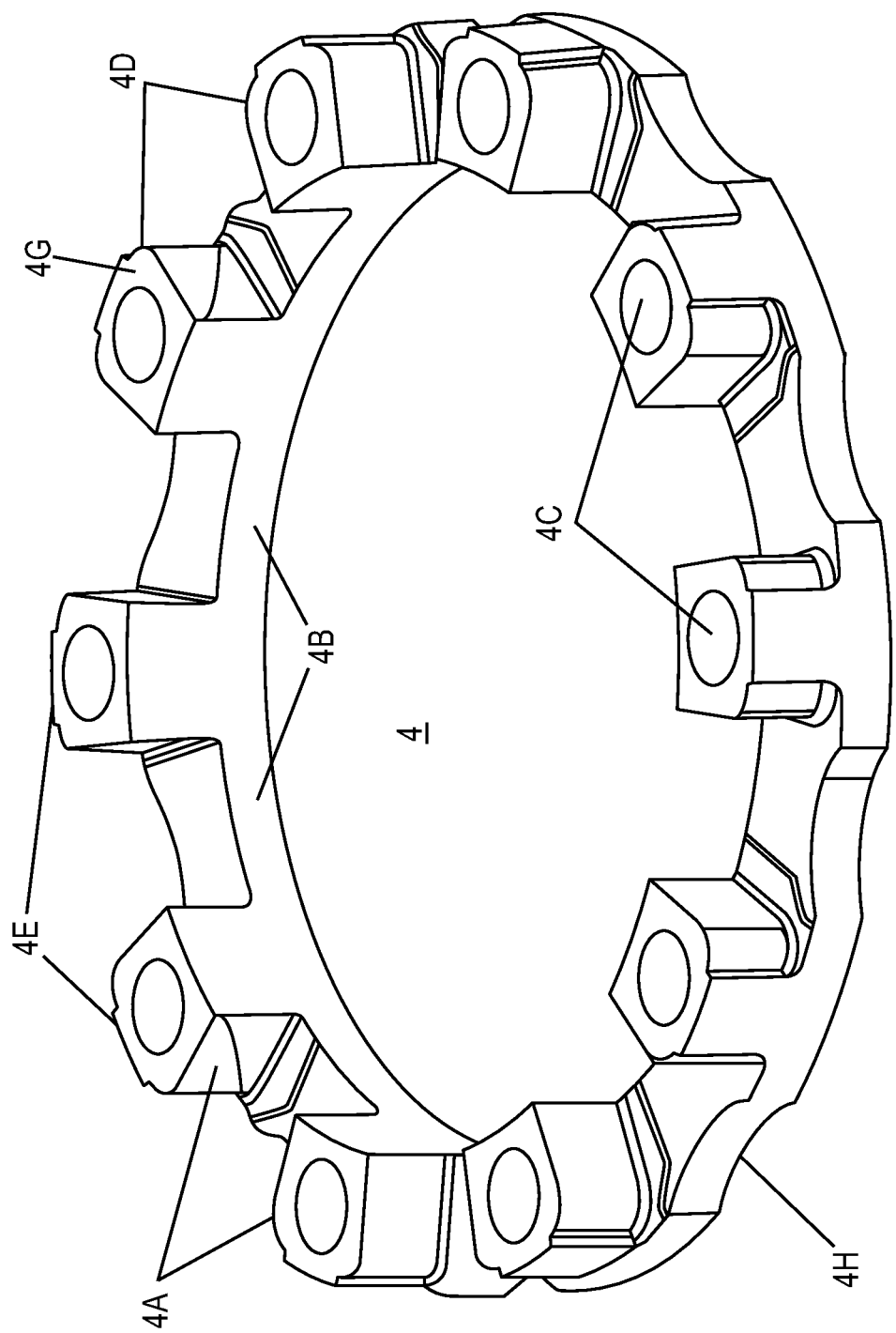
FIG. 1B is an oblique view of a key ring of the FIG. 1A embodiment.

The brake disc 3 at its radially inner circumference has a circumferential array of wedge-shaped slots 3A spaced and shaped to cooperate with corresponding ones of the keys 4A to fix the brake disc 3 relative to the keys 4A in the circumferential direction. The keys 4A in FIG. 1A, shown in greater detail in FIG. 1B, include axial through-holes 4C configured to receive and slide over the studs 6A to non-rotationally fix the key ring 4, and hence the brake disc 3, to the rotating hub 2. In this embodiment, a tone ring 8 of a wheel speed detection system is press-fit onto the hub 2; alternatively, the tone ring may be captured between the hub 2 and the key ring 4 in an annular space between the studs 6A and the hub's inner wheel bearing flange 2A.

In one example of a commercial vehicle wheel end arrangement, 10 studs 6A may be arranged circumferentially about a circle with a radius of 99.82 mm, with the key ring 4's through-holes 4C being laid out on a corresponding radius. The keys 4A may have a width in the circumferential direction of approximately 28 mm and a radial height of approximately 18 mm. In FIG. 1A, the face of the axle hub which receives the brake disc is a substantially continuous planar surface, but the present invention is not limited to a continuous surface. Rather, the axially outer face of the hub may be formed with multiple co-planar surfaces which receive a brake disc and/or key ring adapter. For example, relatively small, flat surface areas may be provided around the brake disc mounting studs in a plane perpendicular to the hub rotation axis. The adapter need not be embodied as a complete ring. Alternatively, the adapter may be in the form of a plurality of individual adapter keys having small projections in the circumferential direction that axially support the brake disc, or sub-portions of a ring, such as a plurality of pairs of keys connecting by a web therebetween. Alternative approaches for securing the adapter are also possible, such as by the use of clamping members that cooperate with the hub to axially retain the mounting adapter, either at the keys or at at least some of the inter-key webs.

Figure 2A:
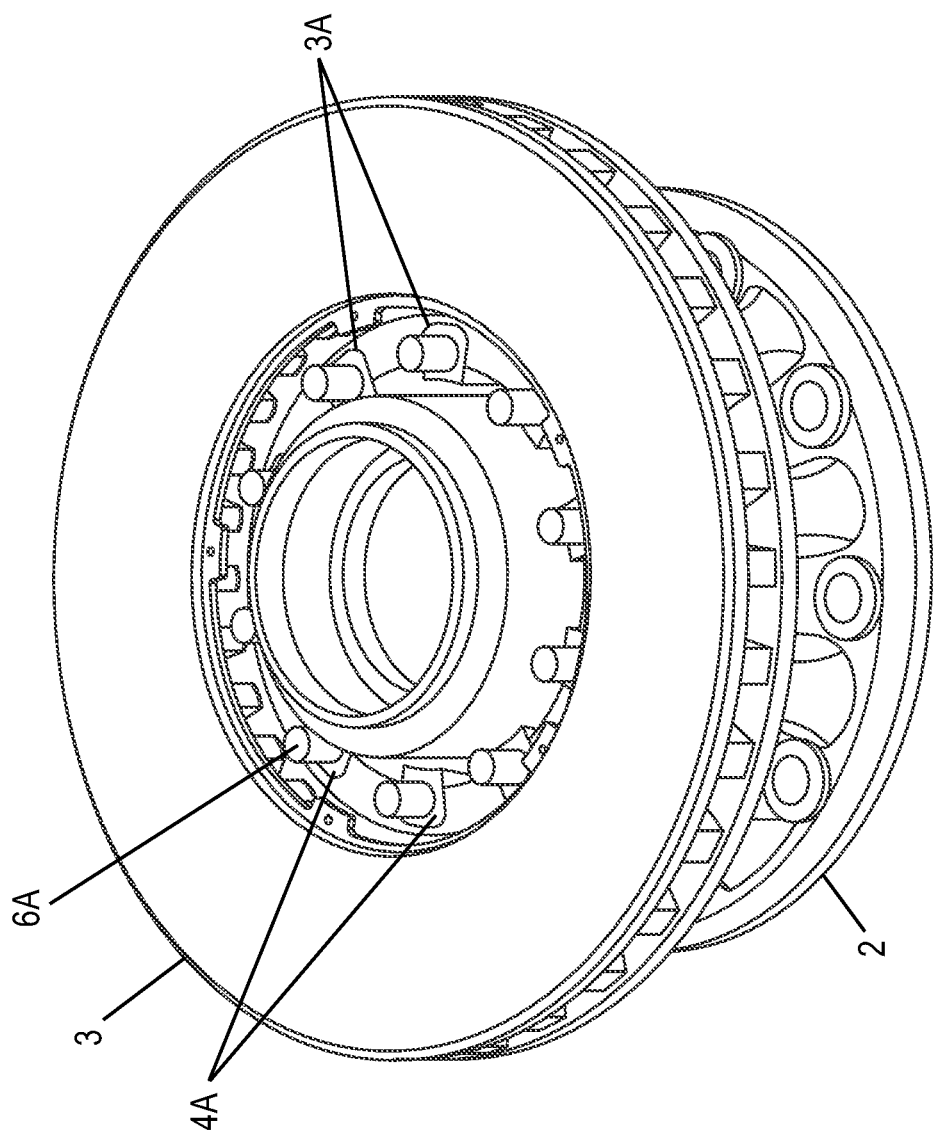
FIG. 2A is an oblique view of the brake disc mounting arrangement of the FIG. 1A embodiment in a partially-assembled state.

FIG. 2A shows a view of the FIG. 1A brake disc mounting embodiment in a partially-assembled state, omitting the retaining ring 5 and retaining members 6B for clarity. The wedge-shaped slots 3A of the inner radial region of the brake disc 3 have been moved axially over their respective keys 4A, which in turn are located on their respective brake disc mounting studs 6A.

Figure 2B:
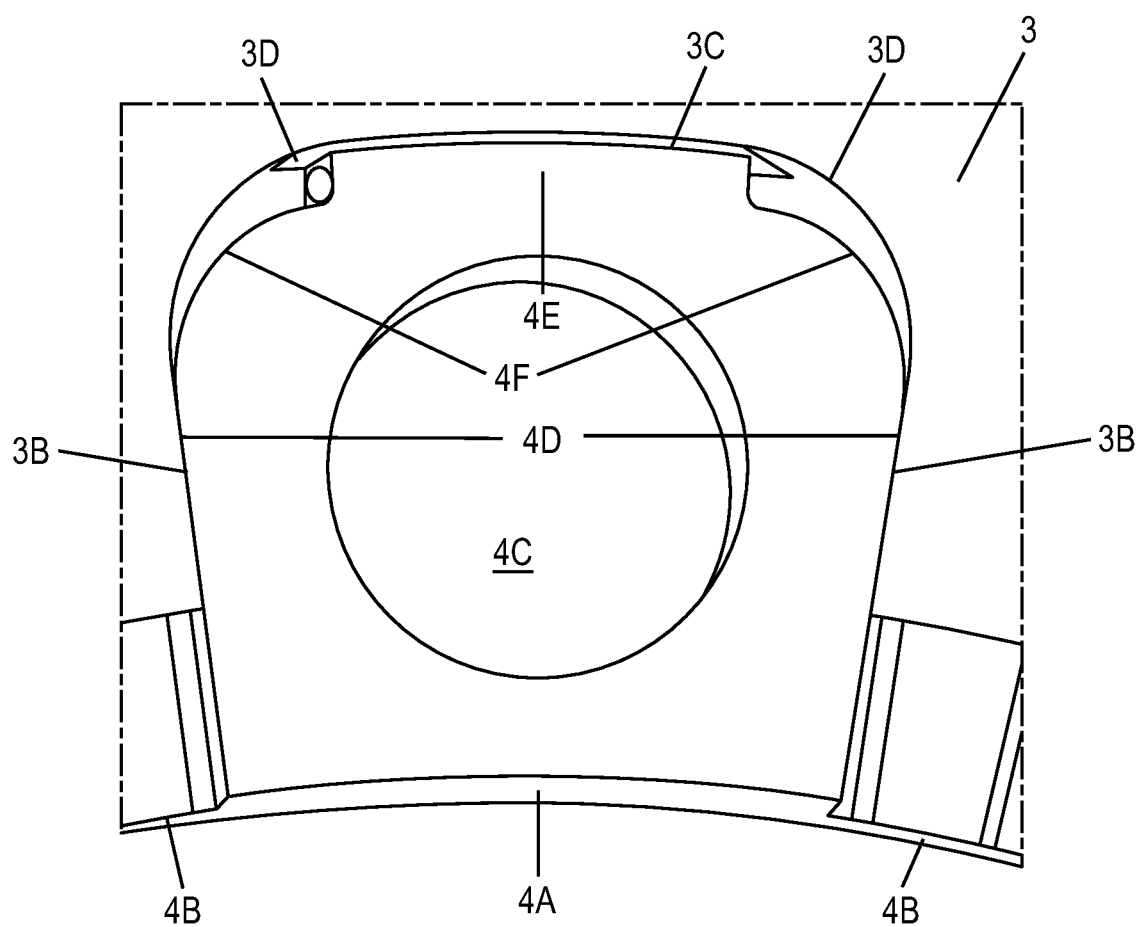
FIG. 2B is an enlarged view of a key and brake disc slot of the FIG. 2A embodiment.

The geometry of an individual key and wedge-shaped slot pair is shown in greater detail in FIG. 2B. The lateral sides 4D of the key 4A and the corresponding lateral sides 3B of the wedge-shaped slot 3 are aligned relatively close to lines that extend radially front the hub rotation axis. With this arrangement, as the key 4A and the brake disc material around the wedge-shaped slot 3A expand and contract due to changes in temperature generated during and after a braking event, the lateral sides 3B and 4D may move across one another without binding. Preferably the clearance between the lateral sides 3B and 4D is maintained as small as practical in order to minimize the potential for differential movement in the circumferential direction, thereby minimizing opportunities for noise- and/or wear-generating impacts between the opposing lateral side contact faces, which may manifest as undesired brake disc vibrations.

Analysis of computer models of example embodiments over a range of temperature and stress loadings expected during operation of commercial vehicle disc brakes has shown that the lateral side clearance may be reduced to 0.15 mm without encountering a temperature and stress loading that results in the brake disc slots being bound up on the keys. Computer modelling has also confirmed the surprising result that there is a narrow range of key and slot side angles, relative to radial lines from the rotation axis, which provide significantly more even distributions of stresses around the circumference of the brake disk during a braking event than shallower or steeper angles. These improved stress distributions were noted in the range of 12°-20°, and more preferably in the range of 16°-18°. This feature of the present invention is discussed further in the context of FIGS. 10A and 10B, below.

FIG. 2B also shows a gap between the radially outer surface 4E of the key 4 and the radially inner surface 3C of the wedge-shaped slot 3A, along with gaps between radiused regions 3D and 4F at the radially outer corners of the slot 3A and key 4A, respectively. In the example commercial vehicle wheel end arrangement, this radially outer gap may be approximately 0.2-2.2 mm. In FIG. 2B the key radially outer surface 4E is shown with a raised outer surface having a radius. This surface minimizes the gap to the brake disc in the central region of the key, but allows for slightly larger gaps in the laterally adjacent regions near the rounded corners 3D and 4F. Alternative outer surface configurations may be used, or the raised outer surface portion may be omitted from surface 4E.

The geometry of the corner radii and the width of the gaps are arranged such that, across the range of thermal and stress loads expected to be encountered during the service life of the brake, the key's radially outer surface 4F does not contact the slot's radially inner surface 3C, or only lightly comes into contact with the surface in a manner that does not apply significant loads to the inner surface 3C.

One of the features of the present invention is the design of the contact surfaces between the keys and the wedge-shaped slots to avoid both stress concentration regions and surface contact stresses high enough to deform the surfaces. Thus, the contact surfaces (whether planar or curved) are designed to provide sufficient contact surface area to maintain local stress levels below at least the plastic deformation range during the life of the brake disc and the keys. Further, the use of relatively broad-radius corner curves substantially reduces stress concentration in both the keys' radially outer corners 4F and the brake disc slots' corners 3D. In the example commercial vehicle wheel end arrangement, the keys' corners 4F may have a radius of 6.5 mm, and the slots' corners may have a radius of 8 mm.

The geometry of the inter-key webs 4B may also be optimized for a given application. For example, where the inter-key webs 4B do not need to be full width in the radial direction in order to withstand the anticipated stresses, portions of the webs may be omitted, such as scalloped regions 4H, to both minimize weight and minimize ring-to-hub contact surface area and thereby decrease conductive heat transfer through the inter-key webs to the hub. This arrangement may also reduce press requirements for manufacturing.

Figure 3:
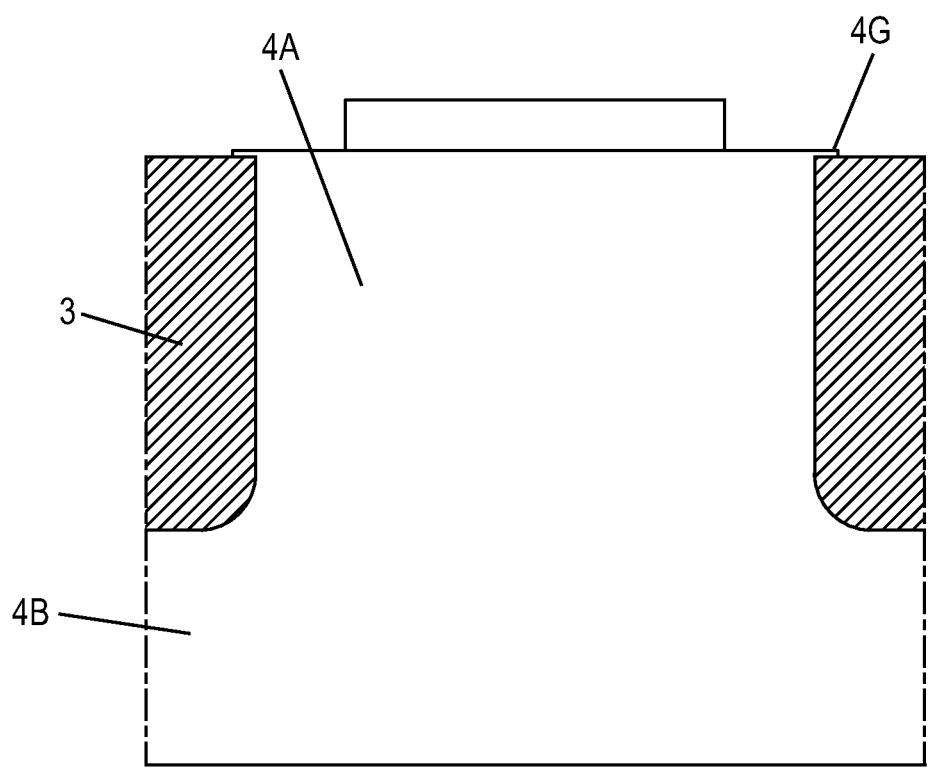
FIG. 3 is an elevation view of the key and brake disc slot of the FIG. 2B embodiment.

FIG. 3 shows a partial view of the key ring 4 and brake disc 3 from the radially inner region, looking radially outward. The bottom of FIG. 3 shows the surface of the key ring 4 which abuts the face of the hub 2 (not shown) when the key ring is in an installed position on the hub 2. In this embodiment, the brake disc slots 3A slide over the keys 4A until the brake disc abuts the inter-key webs 4B, followed by installation of retaining ring 5 and retaining members 6B over the retaining studs 6A (retaining components not shown for clarity).

Preferably, the keys 4A have an axial height that results in an outer end 4G of the keys protruding slightly beyond the face of the brake disc adjacent to the slots 3A. The protruding ends 4G are designed to receive the retaining ring 5 in a manner that axially captures the brake disc 3 between the inter-key webs 4B and the retaining ring 5 in a manner that leaves the brake disc free to move axially over small distances to accommodate axial forces during brake operation (for example, to be able to move to center itself between opposing brake pads without inducing bending stresses in the brake disc that would otherwise be present if the brake disc was immovably mounted), as well as to allow for axial expansion of the brake disc without the disc becoming fixed to the hub. In the example commercial vehicle wheel end arrangement, the axial thickness of the brake disc 3 in the regions adjacent to the slots 3A may be 17.5 mm, with the keys 4A having an axial thickness of 18 mm, thereby providing a 0.5 mm range of axial motion for the floating brake disc. In this example, the overall axial height of the key ring 4 is approximately 29 mm, with the inter-key webs 4B being approximately 11 mm thick. This inter-key web thickness provides enough material to give sufficient key ring stiffness and resistance to deformation when the retaining members 6B are torqued down, while avoiding excess thickness that unnecessarily increases the axial height of the vehicle wheel end.

The present invention is not limited to an arrangement in which the retaining fasteners cooperate with the axle hub (via the hub-mounted studs or apertures in the hub) to capture the retaining ring and the mounting adapter. For example, the retaining fasteners may be bolts that thread into the holes in the mounting adapter keys, while the mounting adapter is separately retained on the axle hub via apertures in the inter-key webs through which pass the hub-mounted studs or fasteners that engage the hub apertures.

Because the greatest physical and thermal stresses may be expected at the keys (which must transfer braking forces from the brake disc to the hub via the retaining studs, and are the primary conductive heat transfer conduits between the brake disc and the hub), the material of the key ring 4 is preferably a high strength, high temperature tolerance material. More preferably, the material of the keys has a thermal expansion coefficient similar to that of the brake disc material to minimize relative movement between the keys and the brake disc slots during braking events.

Preferably the keys are formed from a powdered metal material, especially preferably a powdered metal alloy having a composition of FLC-4805-100HT per MPIF Standard 35 (0.5-0.7% C, 1.2-1.6% Ni, 1.1-1.4% Mo, 0.7-1.4% Cu, 0.3-0.5% Mn, balance Fe). The keys may be formed by compression in a high pressure press in the conventional manner. For the brake discs of a typical commercial vehicle, a 750 Ton press has proven sufficient to produce key rings with the desired targeted material densities in the vicinity of 7 grams/cm$^3$ in the preferred powdered metal alloy materials. As well known in the art, the operating parameters of the press and sintering operations will vary greatly depending on the specific size, shape and desired material properties of the sintered powdered metal component (e.g., the targeted material densities of a specific component). The key ring in the FIG. 1B embodiment was formed in a mold in a 750 Ton press, applying 6000 kN of compressive force when the powdered metal alloy material was at approximately 25° C., and the formed component was sintered at a temperature of 1120° C. Because these parameters are variable and depend on the specific design being produced, and further because one of ordinary skill in the art can, without undue experimentation, vary the production process parameters to ensure the resulting component meets the material property requirements of a particular design, further discussion of the process parameters is omitted.

The key ring 4 is not limited to being a one-piece, integrally-formed component. Alternatively, the key ring may be formed with inter-key webs 4B or a complete base ring to which individual keys 4A are fixed. This latter arrangement permits targeted optimization of material costs and strength, such as the potential use of keys 4A formed from a high-strength material while the remaining portions of the ring are formed from lower-strength, lower-cost material.

Figure 4A:
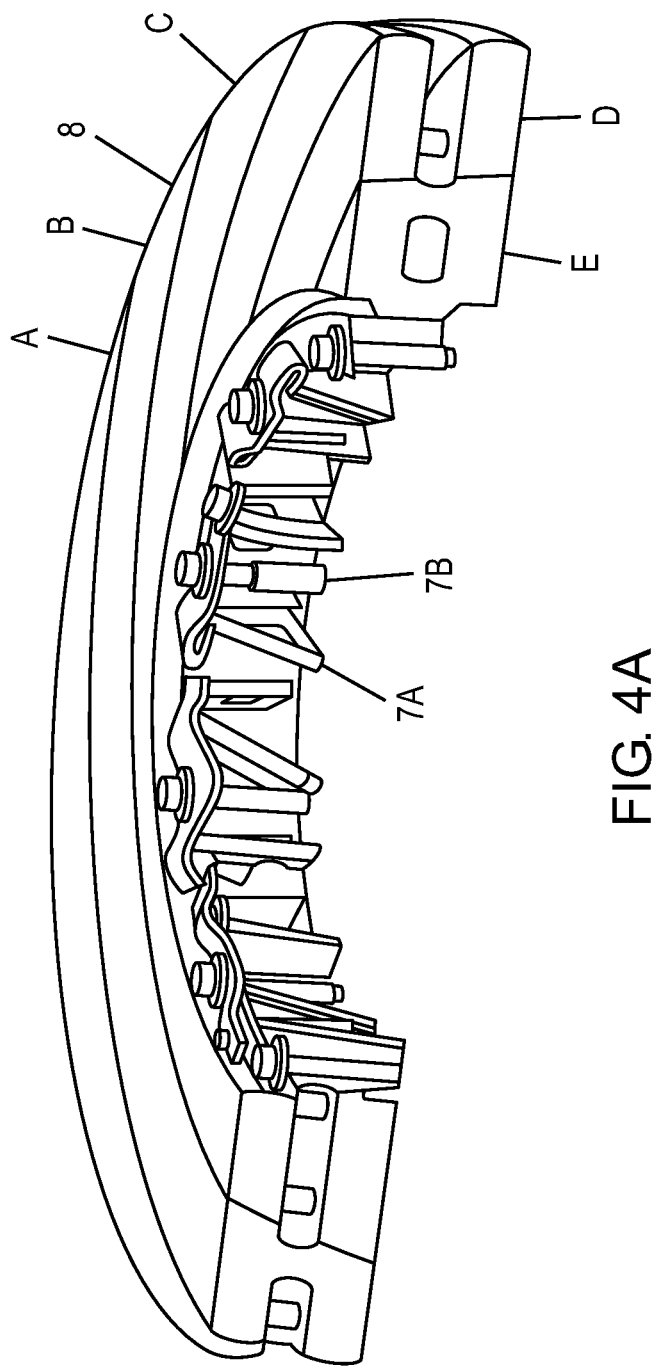
FIG. 4A is an oblique view of a cross-section of a prior art brake disc mounting arrangement undergoing deformation during a braking event.
Figure 4B:
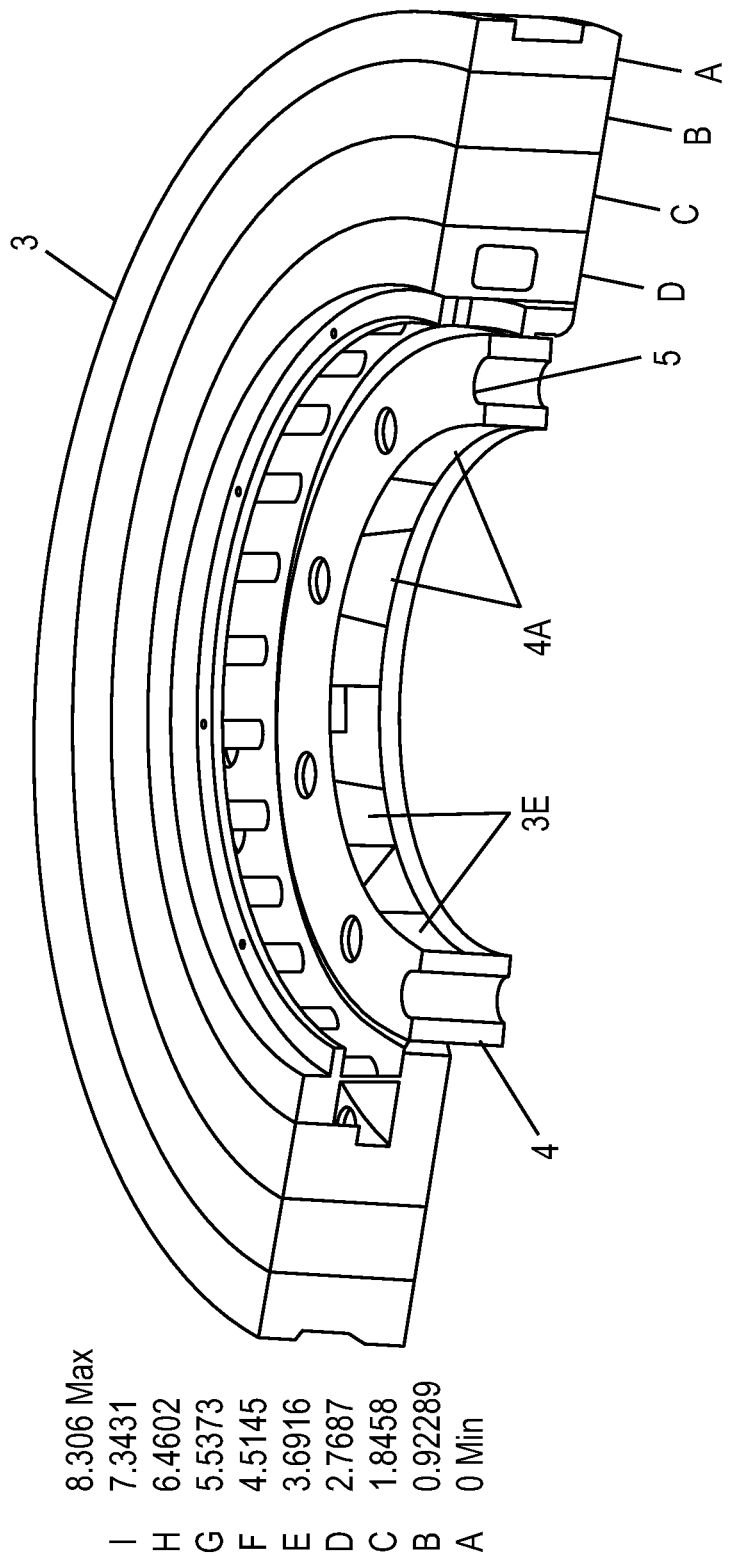
FIG. 4B is an oblique view of a cross-section of a brake disc mounting arrangement in accordance with an embodiment of the present invention undergoing deformation during a braking event.

FIGS. 4A and 4B graphically illustrate another advantage of the present invention, the greatly increased uniformity in stress distribution within the rotor discs of a brake disc that result from the substantially more stiff construction of the present invention's approach to brake disc attachment.

FIG. 4A is an oblique view of a computer model of a cross-section of a prior art brake disc using a splined disc mounting approach of a large number of spring elements 7A and relatively long fasteners 7B holding the brake disc 8 directly to an axle hub (not illustrated). The elongated fasteners 7B are prone to significant elastic deformation during a braking event. The fasteners' deformation allows corresponding local elastic deformation of the brake disc 8, resulting in the brake disc experiencing uneven stress distribution radiating away from the region where the brake pads are applying forces to the disc friction rings. In the FIG. 4A example, as the individual fasteners pass through the region in which the brake caliper presses the brake pads against the friction surface of the brake disc 8 (in this figure, in the upper left region of the brake disc), the deformation in the brake disc is highest (up to 9.37 mm) at the outer radius of the disc, and is still more than 6 mm at the inner radius in the brake pad region.

FIG. 4B shows how the rigid structure of the relatively broad keys and the large contact surfaces between the keys and the brake disc slots of the present invention better resists elastic deformation at the brake disc mounting region, and hence across the entire brake disc. This is visible in the nearly-constant amount of deformation in the brake disc around its entire circumference, with this more even load bearing resulting in 11% lower peak deformation at the outer radius of the disc friction surface (8.306 mm vs. 9.375 mm), and an even greater 40% reduction in deformation at the brake disc's inner radius (3.69 mm vs. 6.25 mm). The additional stability of the brake disc, particularly at the inner region where the brake disc is attached to the hub, provides a disc mounting arrangement that is more durable and long-lived than previous mounting approaches.

In a further embodiment, the brake disc 3 and key ring 4 may be designed as parts of a "generic" brake disc system in which a single brake disc, or one of only a few such brake discs, having the present invention's gap-driven key mounting arrangement is configured to cooperate with a suitable key ring adapter to replace application-specific brake discs.

Figure 5:
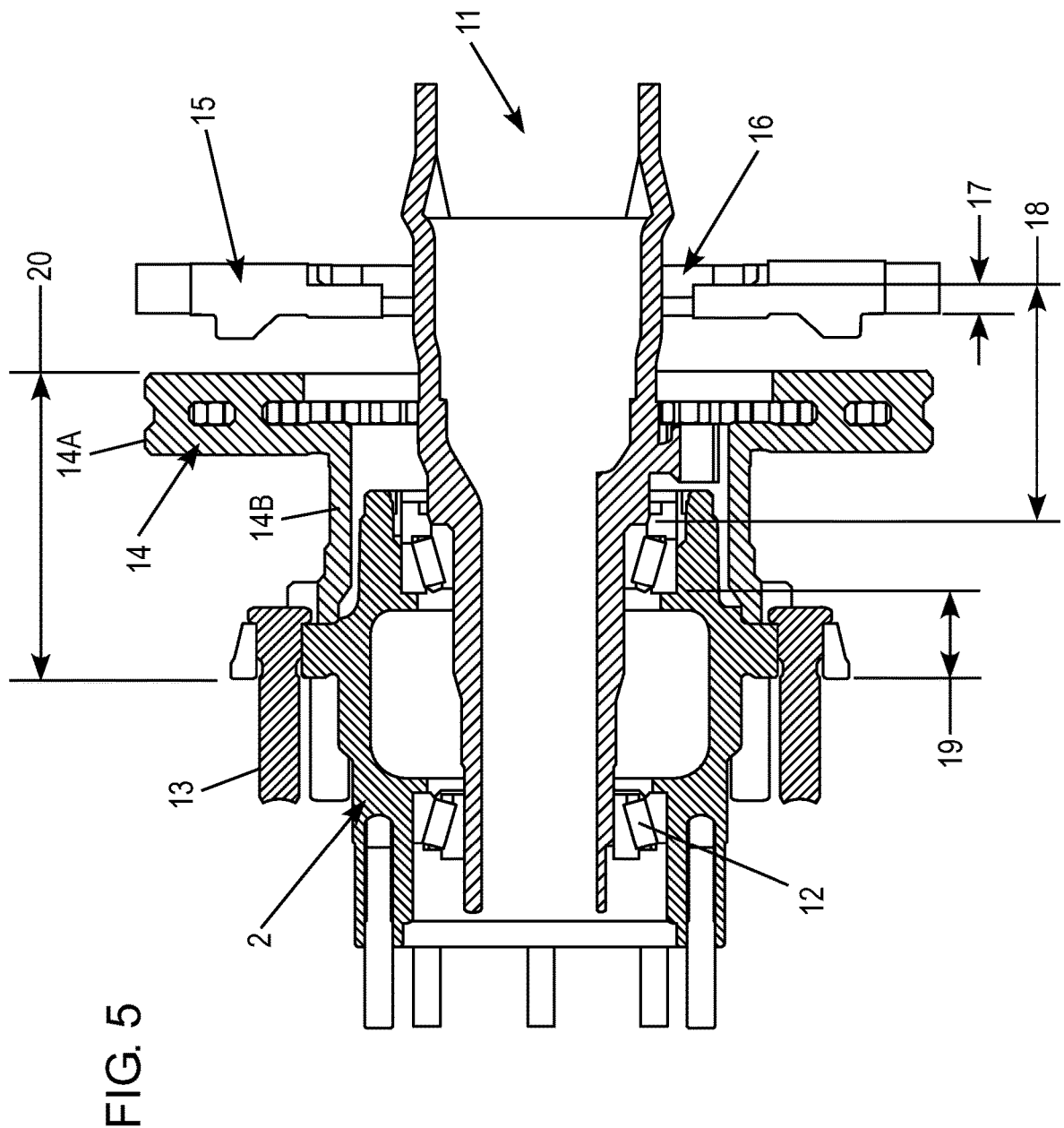
FIG. 5 is a cross-section view of a commercial vehicle wheel end arrangement.

FIG. 5 is a cross-section view of a typical commercial vehicle wheel end arrangement 10. Axle 11 supports a hub 2 via bearings 12. The hub 2 has wheel mounting studs 13 facing axially outward (in FIG. 5, toward the left side of the figure), and on a rear or inner side receives a brake disc 14 having rotor friction portion 14A and rotor hat portion 14B. The rotor is straddled in the known manner by a brake carrier and caliper (omitted for clarity) which is non-rotatably supported on a torque plate (aka anchor plate) 15 via a brake flange 16 fixed to the axle 11.

Important dimensions in any combination of these wheel end components include: the torque plate offset distance 17, i.e., the distance by which the torque plate 15 holding the brake carrier is axially offset from the axle's brake flange 16; the flange offset distance 18, i.e., the distance the axle's hub-locating surface (here, the axle bearing seat for the inner one of the hub bearings 12) to the axle's brake flange 16; the hub offset 19, i.e., the distance from the hub's axial locating surface (here, the opposite side of the inner hub bearing 12) to the face of the hub flange that receives a wheel; and the brake disc offset 20, i.e., the distance between the hub's wheel flange and the friction surface of the brake disc rotor portion 14A. Regardless of the manufacturer(s) of these components, and specific combinations of components dictate where the brake disc 14 is located axially along the axle.

Figure 6:
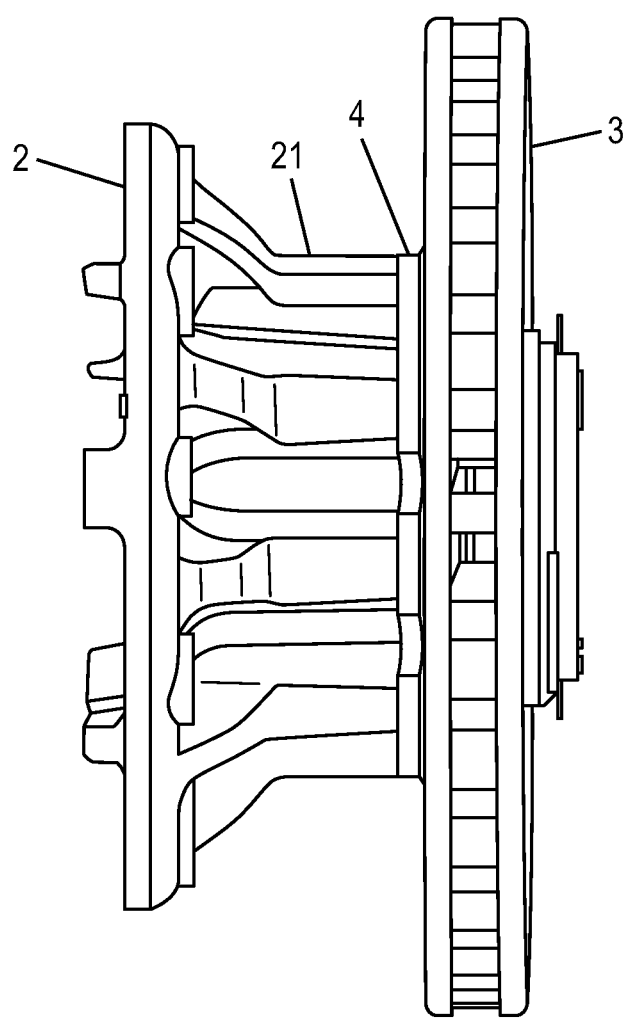
FIG. 6 in an elevation side view of a brake disc and hub in accordance with the present invention.

The wheel end arrangement shown in FIG. 5 uses a brake disc 14 with a rotor portion 14A that is connected to the inner face of the hub 2 via the axial drum-shaped rotor hat 14B, but other hub configurations are known, such as the hub shown in FIG. 6 having a drum-shaped section 21 extending axially inward to the location of the rotor portion 14A to support the rotor.

In the FIG. 6 embodiment, the brake disc 3 is received by the key ring 4 on the inner end of the hub drum-shaped portion 21. With knowledge a particular combination of wheel end components (regardless of manufacturer), the final axial position of the rotor portion of the brake disc may be readily determined. The thickness of the inter-key webs 4B may then be set such that the friction surfaces of the rotor 3 are axially positioned in the same location as the rotor portion 14A in FIG. 5.

Figure 7:
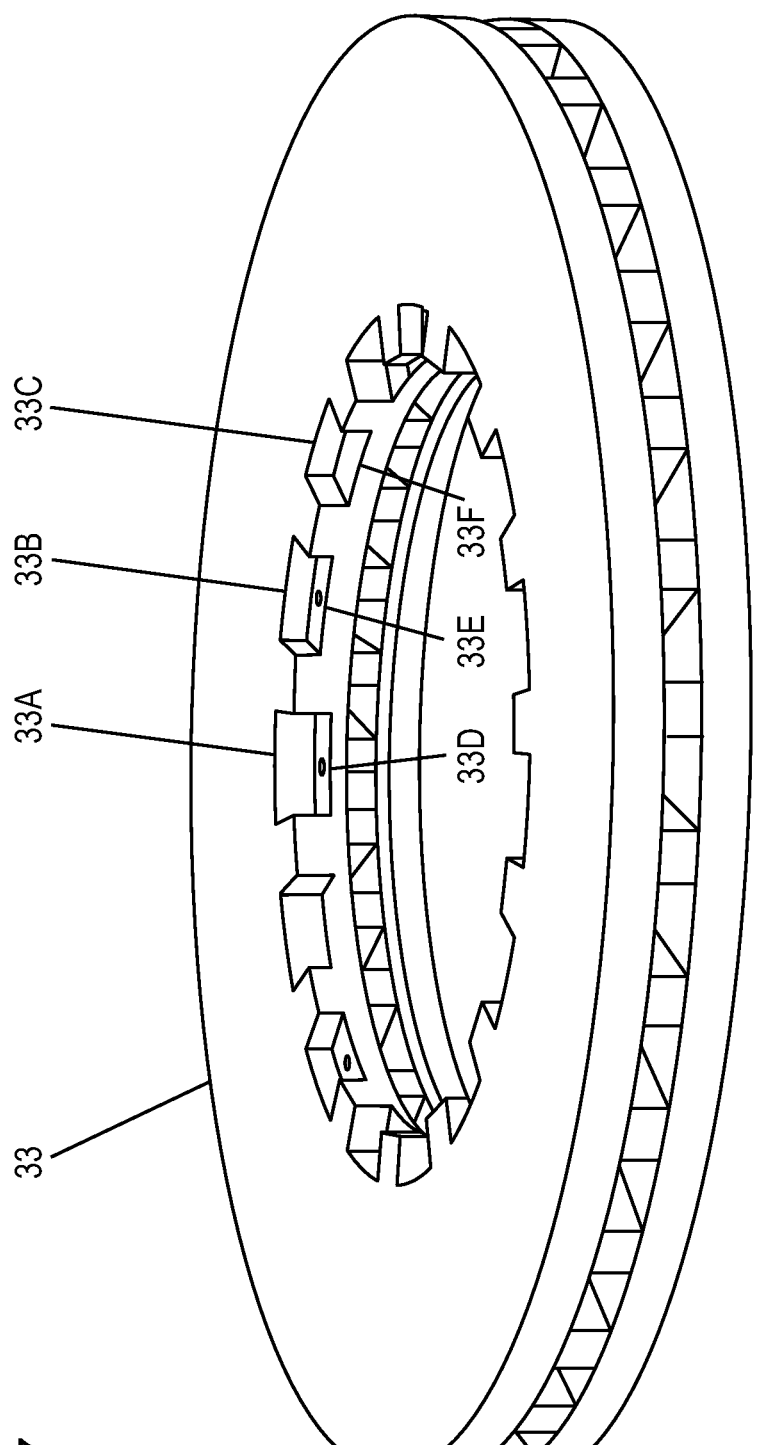
FIG. 7 is an oblique view of a brake disc showing multi-stepped key-receiving slots in accordance with an embodiment of the present invention.
Figure 8:
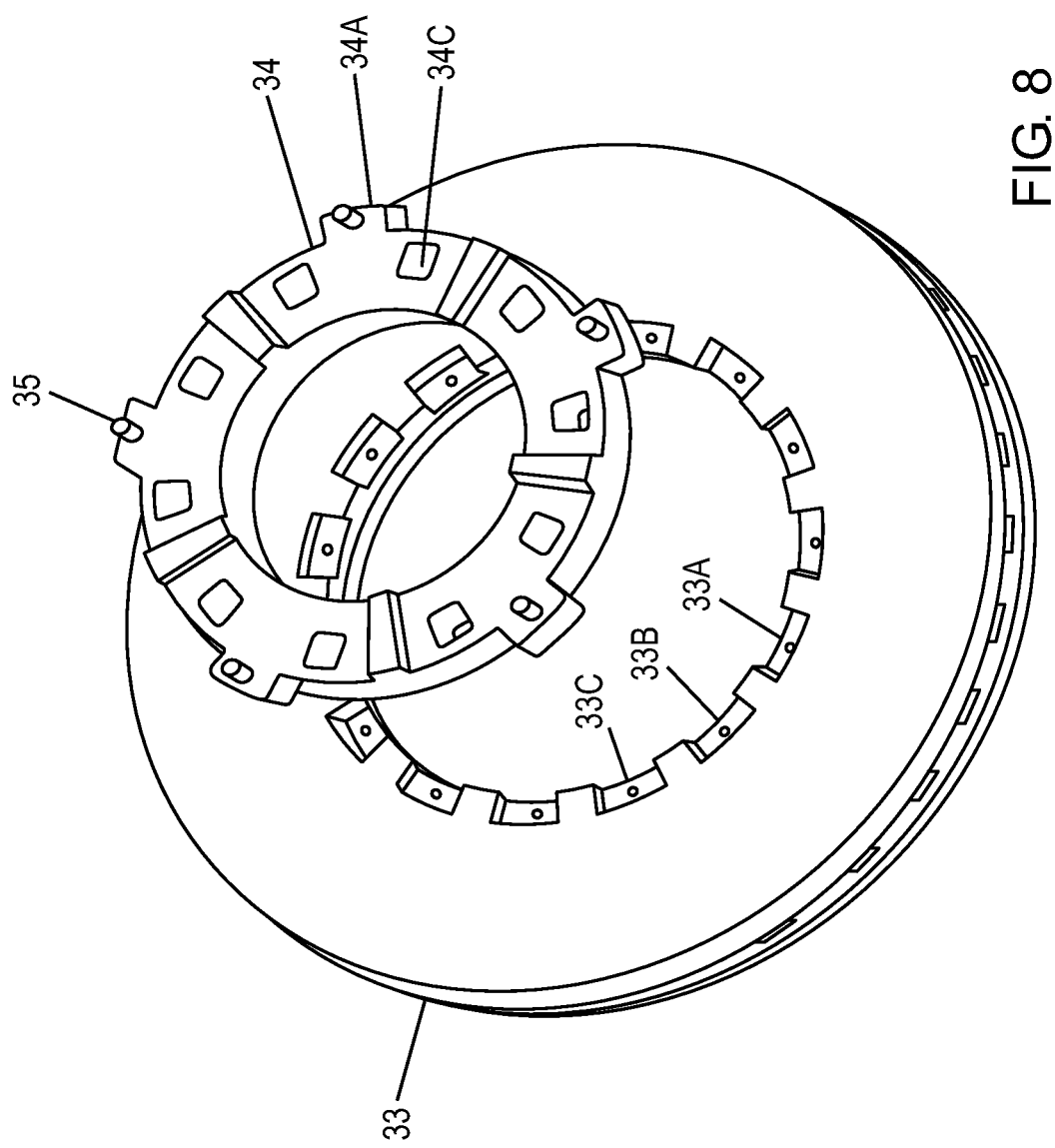
FIG. 8 is an oblique expanded view of the brake disc of FIG. 6 and a corresponding key ring.

The universality of the present invention's approach may be further extended, and the number of brake disc and key ring parts needed to be maintained in inventory may be further reduced, by using brake discs with multiple key-to-brake disc contact surface heights, as shown in FIGS. 7-8.

While in the industry there are numerous possible combinations of wheel end components, as a practical matter the constraints on the available space for mounting components at a wheel end (e.g., limited space inside a wheel rim envelope, limitations from nearby adjacent components such as knuckles and steering components) results in the range of brake disc axial locations being relatively limited, on the order of millimeters. In such applications, the present invention can provide a flexible brake disc mounting solution that can accommodate several wheel end component combinations with only minimal number of "universal" brake discs and key ring adapters.

FIG. 7 shows a brake disc 33 with a plurality of wedge-shaped slots 33A, 33B, 33C corresponding to the wedge-shaped slots 3A in FIG. 1. Unlike the wedge-shaped slots 3A, the slots 33A, 33B, 33C are not open in the axial direction, but instead have stepped regions 33D, 33E, 33F of different thicknesses. For example, the thicknesses of the stepped regions may be set with a 4 mm separation, enabling one brake disc 33 to cover applications over a broad 8 mm range of axial location needs. The desired axial brake disc offset may be obtained by, as shown in FIG. 8, by rotating during installation a key ring 34 having keys 34A configured and spaced around the key ring to match groups of slot stepped regions having the same axial thickness (in this embodiment, a key corresponding to every third brake disc slot, corresponding to the three groups of stepped regions with different axial thicknesses). This embodiment further shows an alternative key ring configuration, in which the key ring is secured to the hub by fasteners passing through apertures 34C that are on a radius smaller that the inner radius of the brake disc 33, with additional fasteners 35 being used to secure the keys 34A to their respective brake disc slots. This arrangement eliminates the need for use of a separate brake disc retaining ring such as the retaining ring 5 in the FIG. 1A embodiment. This alternative fixation arrangement is not limited to this configuration, however. For example, the hub's fasteners (e.g., brake disc mounting studs or bolts) may pass through holes in the keys corresponding to holes 4C in the FIG. 1A embodiment and through holes in at least the brake disc slot stepped regions that are being used to set the brake disc axial offset location.

Figure 9:
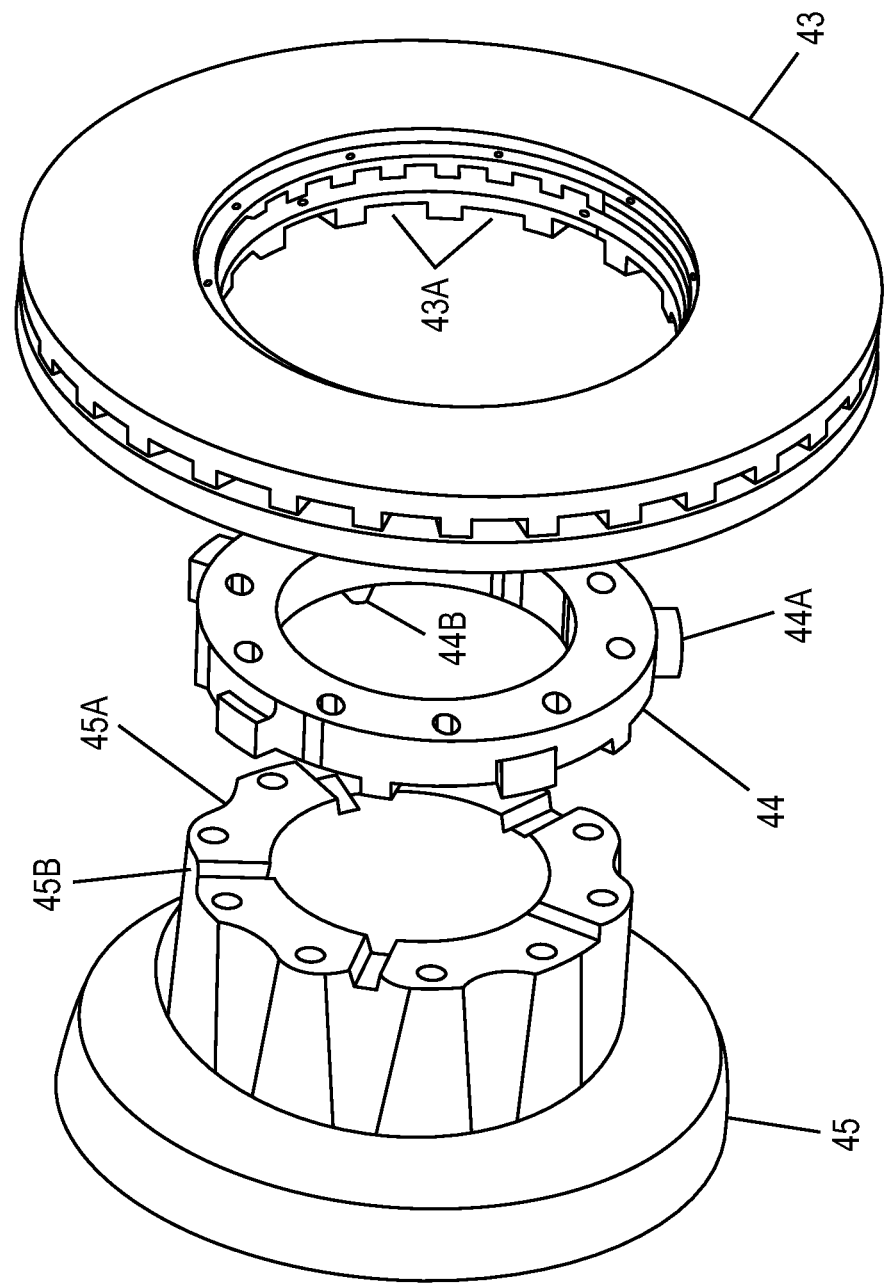
FIG. 9 is an oblique expanded view of a universal brake disc mounting arrangement in accordance with an embodiment of the present invention.

Similarly, a "universal" brake disc may be provided with slot shelves all having the same thickness, to be used with one of a plurality of key rings having different key heights, as shown in FIG. 9. In this embodiment, the brake disc 43 has wedge-shaped slots 43A of the same axial depth (and thus shelves of the same axial thickness), with the key ring 44 selected for use in the particular application having keys 44A in corresponding locations about the key ring to position the brake disc 43 at the desired axial offset position when the brake disc is installed on the key ring.

FIG. 9 shows a further feature of the present invention. Among the wheel end parameters that may vary between different manufacturers' wheel end configurations are the diameter of the axle and the diameter of the hub bearings on which the hub is mounted on the axle. In another variation on the present invention, a "universal" hub adapter 45 may be provided to provide a standardized interface on which the key ring 44 is received. The hub adapter may be produced in a limited number of size configurations that would cover a majority of hub models produced by various manufacturers, with the hub adapter dimensioned with an inner radius that would fit over various-diameter hub barrels while maintaining a standardized end face 45A to corresponding key rings 44. Advantageously the standardized end face 45 may include alignment slots 45B configured receive corresponding alignment ribs 44B of die key ring 44 to align these components and assist the brake disc mounting studs (not shown for clarity) as anti-rotation features.

Figure 10A:
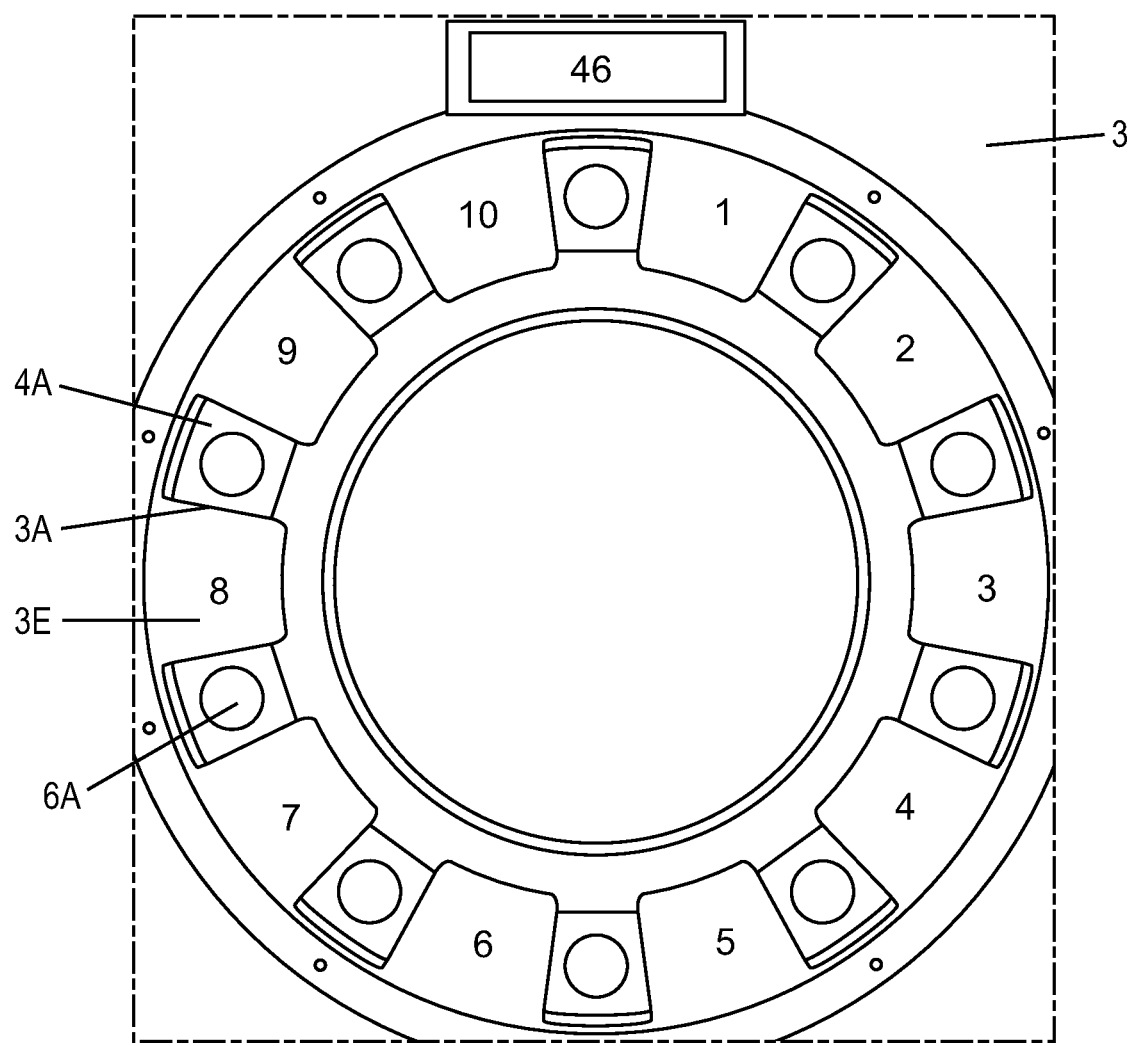
FIG. 10A is a partial view of the hub region of a brake disc mounting arrangement in accordance with an embodiment of the present invention.
Figure 10B:
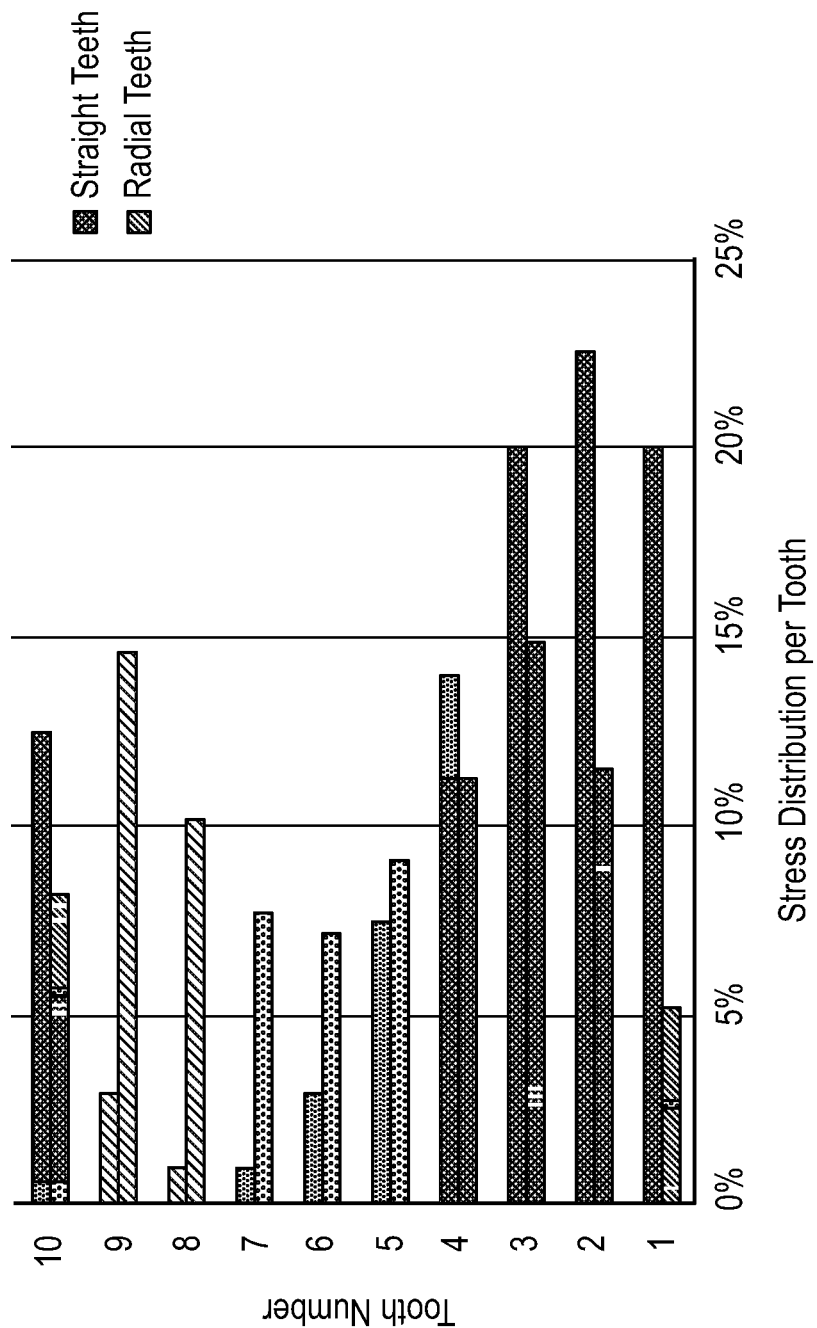
FIG. 10B is a comparative stress distribution chart illustrating stress levels in the FIG. 10A brake disc mounting arrangement.

An example of the extent of improvement in the brake disc stress levels possible in the mounting arrangements of the present invention in provided with the assistance of FIGS. 10A and 10B. FIG. 10A shows a partial view of the hub region of a brake disc mourning arrangement having ten retaining studs 6A, ten keys 4A, ten brake disc wedge-shaped slots 3A, and ten numbered radially-inward brake disc teeth 3E between the slots 3A. At the top of FIG. 10A is a schematically illustrated brake pad 46 symbolizing the location at which the brake pads interact with the brake disc friction surfaces and generate braking forces dial are transferred via the brake disc, the key ring and retaining studs to the hub 2 (not illustrated here for clarity).

FIG. 10B shows a comparative stress distribution bar graph, illustrating stress levels in the FIG. 10A brake disc mounting arrangement. As the brake pads apply braking forces to the friction surfaces of the brake disc, uneven force distribution patterns develop in the rotating brake disc. This results from several factors, including localized deformation of the brake disc as one portion of the friction surface disc enters the region clamped by the brake pads and another portion leaves the brake pad region.

The FIG. 10B graph shows example stress distributions in each of the ten brake disc teeth in two brake disc examples, a brake disc having parallel-sided ("straight") teeth commonly found on so-called splined brake discs, and a brake disc having teeth with angled sides in accordance with the present invention. In this embodiment the angled teeth sides are at an angle of 16°. The graph plots the relative amount of the stress borne by each of the brake disc teeth (x-axis) against each tooth position (y-axis). The upper bar at each tooth position represents that tooth's share of the loading by the applied braking forces in the case of the brake disc with straight-sided teeth. The lower bars then represent share of the brake force loading of each tooth in the FIG. 10A embodiment of the present invention.

FIG. 10B shows that a significantly better stress distribution was observed in the brake disc having present invention's radial tooth arrangement as compared to a straight-tooth brake disc. In this comparison, the tooth in the FIG. 10A brake disc bearing the highest stress was loaded at a level that was substantially lower than the highest-stress tooth in the straight-tooth brake disc: the FIG. 10A tooth 3 carried 14.9% of the brake force loading, as compared to the straight-tooth brake disc's tooth 2 bearing 22.6% of the total load. Thus, the present invention provided a much more even circumferential distribution of braking forces, reducing maximum stresses to approximately two-thirds of a prior art brake disc. This large decrease in stress level enables many design benefits because the components and the materials being used do not have to be able withstand the much higher peak stresses seen in the prior art.

Figure 11A:
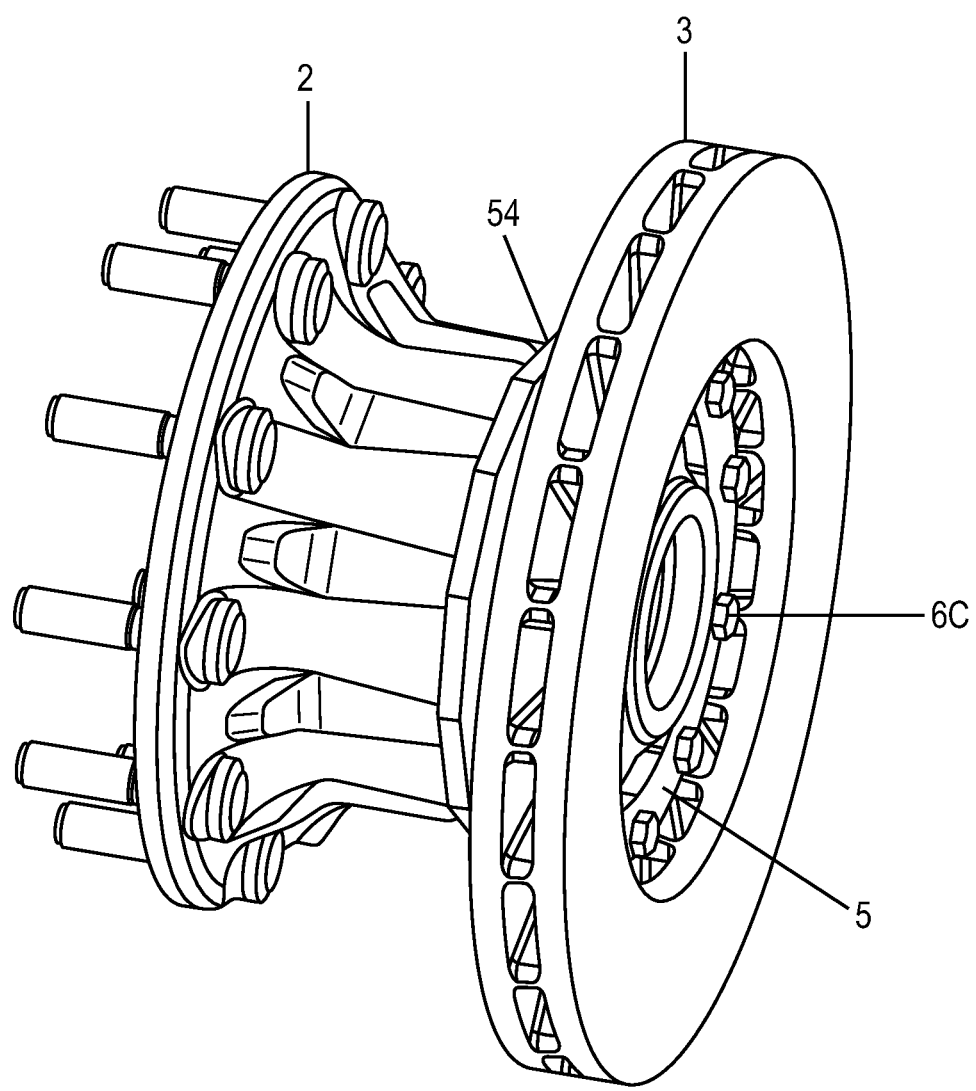
FIGS. 11A-11B are oblique and exploded views of an adjustable position brake disc arrangement in accordance with an embodiment of the present invention.
Figure 11B:
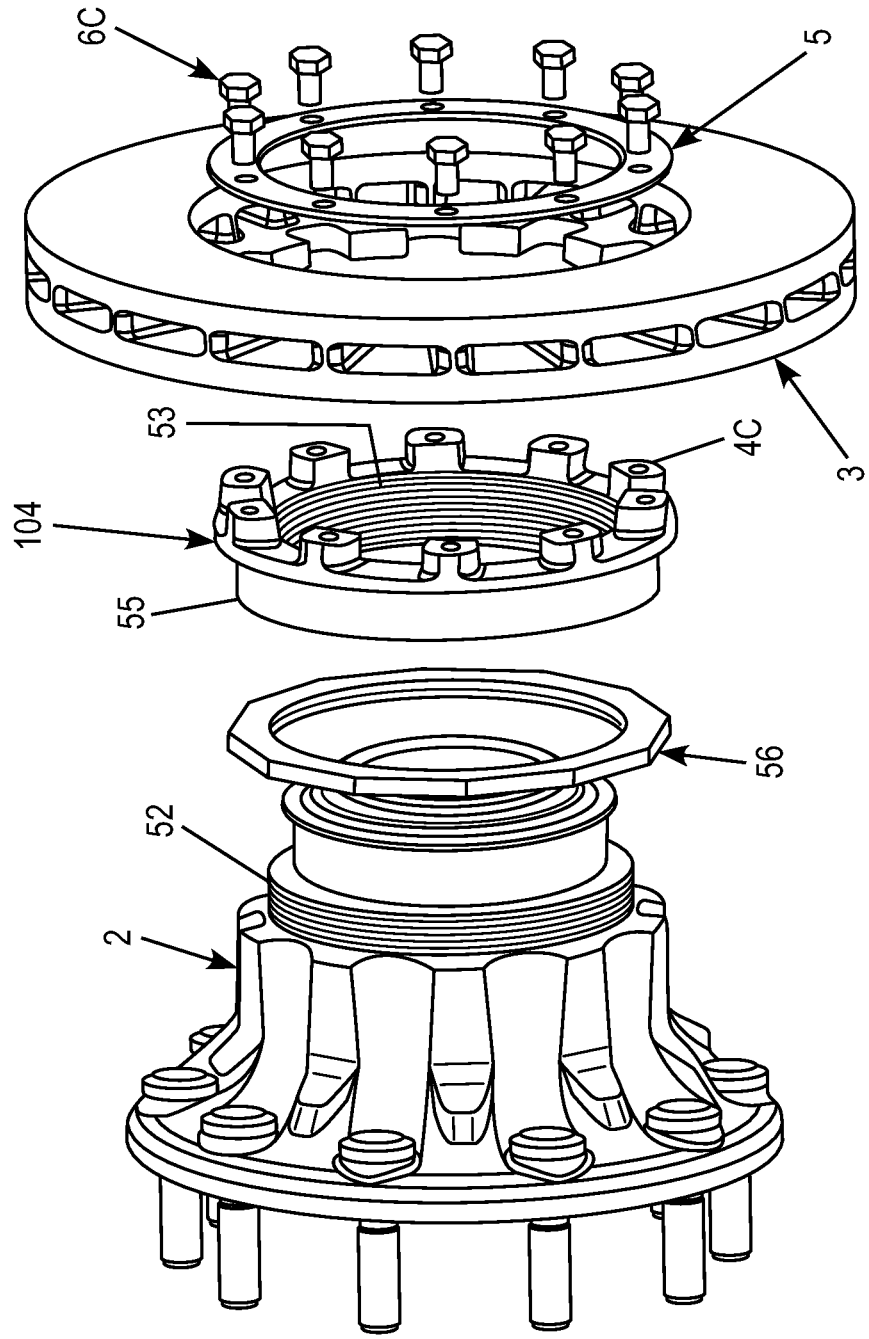

Additional embodiments of a "universal" brake disc mounting arrangement in accordance with the present invention are shown in FIGS. 11A-11B.

The first of the additional embodiments is shown in FIGS. 11A-11B and 12A-12B. In this embodiment the axial position of the brake rotor 3 is readily adjustable by the use of a threaded axial stop arrangement. In this embodiment of the arrangement, the hub 2 is provided with external threads 52. A corresponding locknut 54 is threaded onto the external threads 52 a predetermined distance (discussed further, below). The key ring in this embodiment takes the form of an adjustable intermediate ring 104, having keys 4 on a face axially away from the hub 2, and an internal thread 53 in a collar portion 55 which is configured to engage the hub external thread 52. With this arrangement, the axial position of the brake rotor 3 may be set to any location within the range of thread overlap by rotating the adjustable intermediate ring 104 to the desired depth, and then rotating the locknut 54 against the hub-side face of the collar 55 to lock the position of the ring 104. The brake rotor 3 may then be secured on the keys 4 with retaining ring 5 and retaining members, in this embodiment hex bolts 6C which thread into corresponding internal threads in key holes 4C.

A cross-section-view of the FIG. 11A embodiment is shown in FIG. 12A, with the axial height of the collar portion 55 of the intermediate ring 104 spaced as a desired depth above the shoulder on hub 2 at the end of its external threads 52. As shown in the enlarged portion of FIG. 12A in FIG. 12B, as in the FIG. 3 embodiment preferably the axial height of the keys 4A are taller than that of the adjacent portions of the brake disc 3, such that there is a protruding key end 4G that receives the retaining ring 5 and thereby ensures the brake rotor 3 remains free to axially float between the hub 2 and the retaining ring 5.

Another embodiment of the present invention is illustrated in FIGS. 13A-13B and 14A-14C. As with the embodiment in FIGS. 11A-11B and 12A-12B, large-diameter threaded sections and a large locking nut are used to set a desired axial position of the brake rotor 3. A difference in this and the previous embodiment is that this embodiment provides for ready adaptation of a common brake rotor 3 to already-existing hub designs (either as a back-fit kit or in a newly-manufactured brake) by use of an adapter base 56 sized to slide over existing brake disc retaining studs 6A and be retaining against the face of the hub 2 by retaining members 6B. The adapter base 56 carries the external threads on which are threaded the locknut 54 and the collar 55 of the intermediate ring 104. The remaining assembly of the brake then proceeds as in the previous embodiment, with the locknut 54 and collar portion 55 being threaded onto the adapter base 56 and axially locked into position against one another, and location of the brake rotor 3 on the keys 4A, retained by retaining ring 5 and hex bolls 6C. With this arrangement, a conventional unthreaded hub 2 may be adapted without additional machining or wholesale hub replacement to allow use of a common brake rotor 3.

Figure 13A:
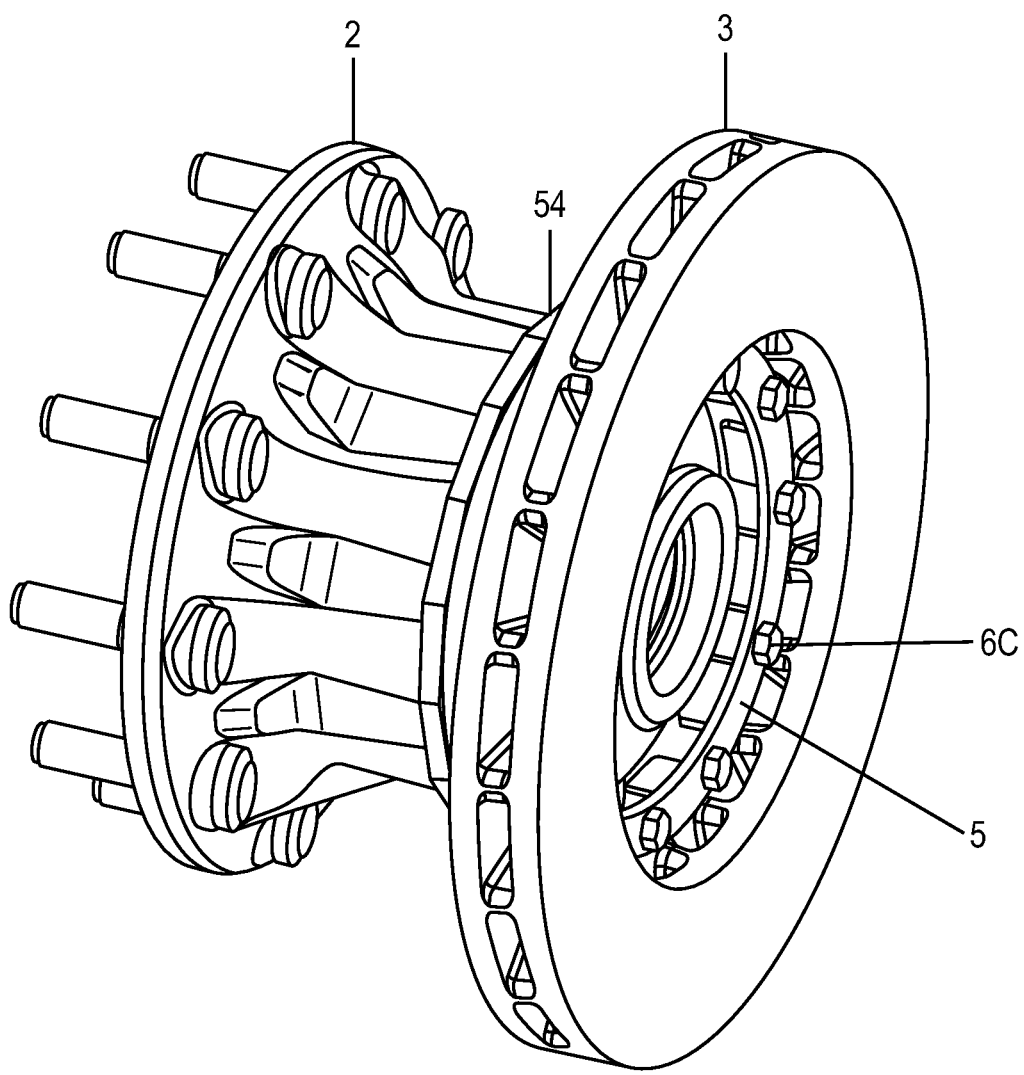
FIGS. 13A-13B are oblique and exploded views of another adjustable position brake disc arrangement in accordance with an embodiment of the present invention.
Figure 13B:
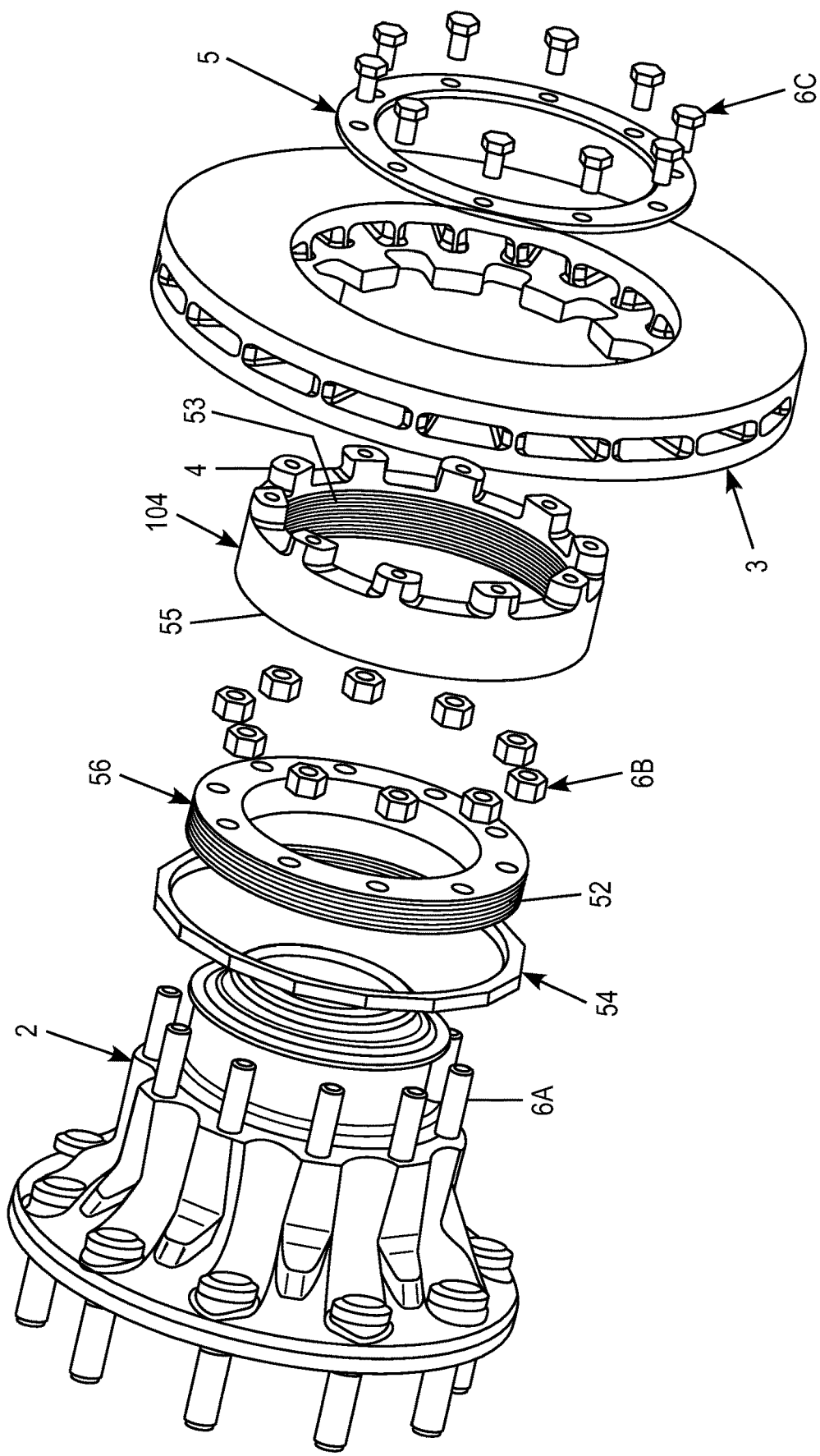

A cross-section-view of the FIG. 13A embodiment is shown in FIG. 14A, with additional details shown in the enlarged portions in FIGS. 14B-14C. FIG. 14B shows the securing of the adapter base 56, with its external threads 52, to the hub 2 by studs 6A and nuts 6B. Because the adapter base 56 fasteners 6B may be installed prior to installation of the locknut 54 and intermediate ring 104, a technician has free access to torque the fasteners 6B to a prescribed lightness. This view also shows the collar 55 of the intermediate ring 104 having been secured against rotation out of its axial position by thread friction generated by tightening of the locknut 54 against the axial face of the collar.

FIG. 14C shows the location of the brake rotor 3 on the keys 4A of the intermediate ring 104 in the same manner as in the previous embodiment, with the protruding face 4G of the key 4A holding the retaining ring axially outward such that the brake rotor 3 remains able to axially float.

FIGS. 15, 16A-16H and 17A-17B show a further embodiment of an arrangement of the present invention that is readily adaptable to use on existing hub designs.

Figure 15:
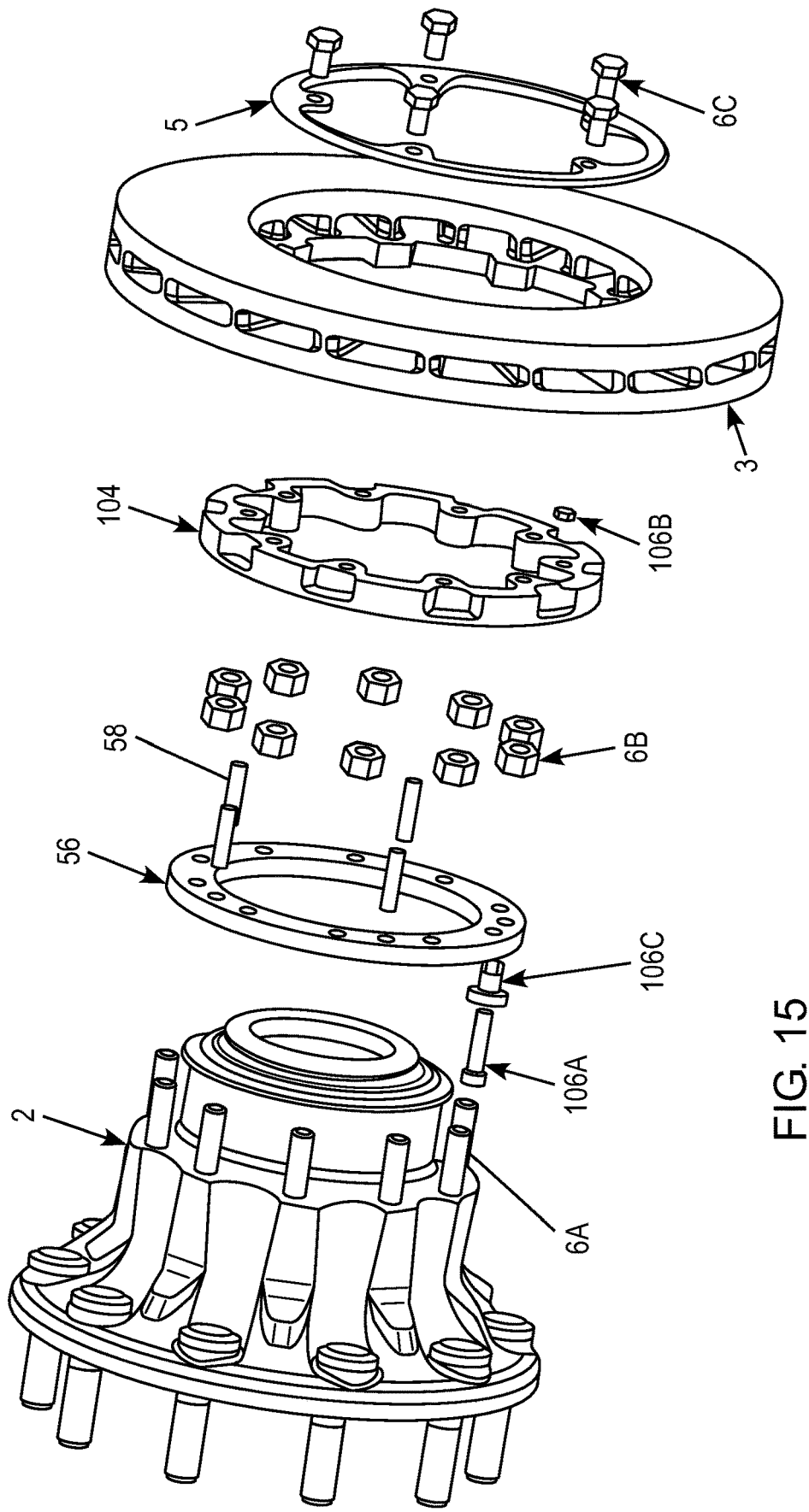
FIG. 15 is an oblique exploded view of a further adjustable position brake disc arrangement in accordance with an embodiment of the present invention.

In the FIG. 15 embodiment, the adapter base 56 is also retained on the hub's studs 6A on an axial face of the hub 2, but the intermediate ring 104 is not held directly on the axial face of the adapter base 56. Instead, a plurality of leadscrews 106A protrude axially outward from the adapter base, and threaded collars 106C located are located on the leadscrews 106A between the adapter base and the intermediate ring 104. The axial position of the intermediate ring 104, and hence the brake rotor 3, is set by rotation of the threaded collars 106C on their respective leadscrews 106A. In this embodiment, the intermediate ring 104 does not have an axially-extending collar portion 55, which facilitates positioning of the brake rotor 3 axially closer to hub 2.

Figure 16A:
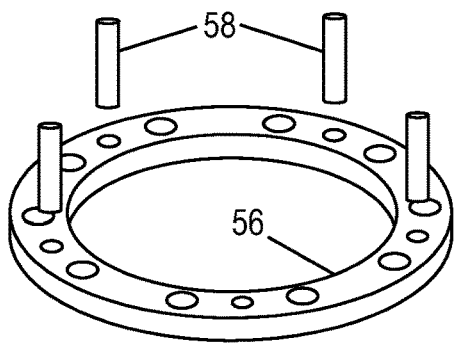
FIGS. 16A-16H are oblique and elevation views of the assembly process of the brake disc arrangement of FIG. 15.
Figure 16B:
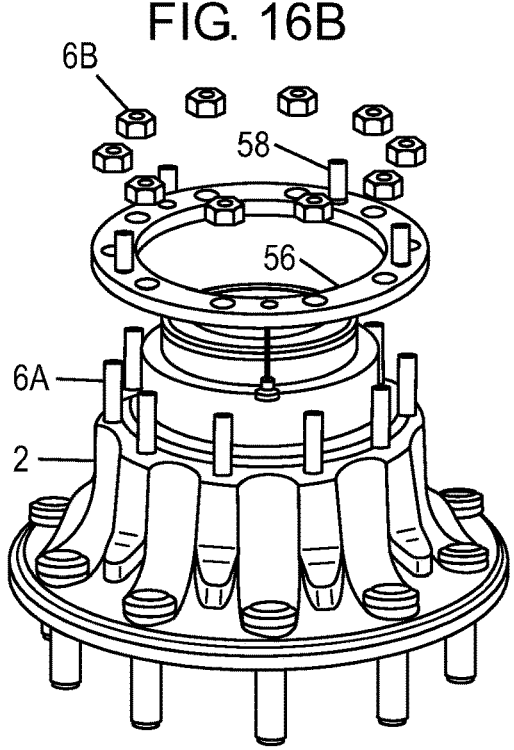
Figure 16C:
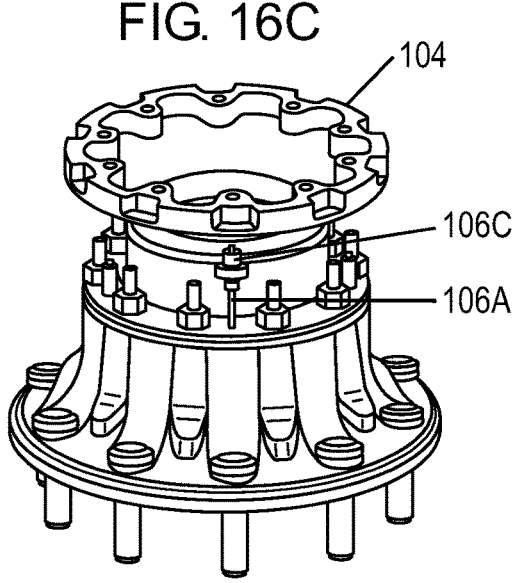
Figure 16D:
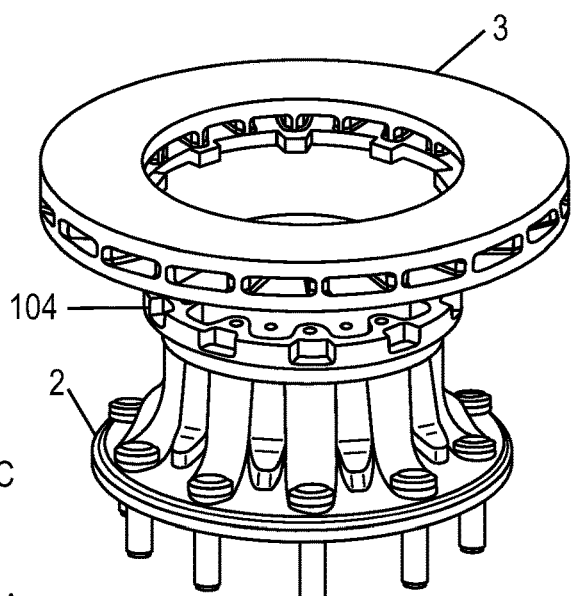

The intermediate ring in this embodiment is guided in the circumferential direction by pins 58 installed on the adapter base 56 in FIG. 16A and the leadscrews 106A, which alternate with one another and together cooperate to sustain the loads applied by the brake rotor 3 in the circumferential direction during a braking event. As shown in FIG. 16B, the heads of the leadscrews 106A are captured between the adapter base 56 and the hub 2 when the adapter base 56 is passed over the hub studs 6A and secured to the hub 2 by fasteners 6B. FIG. 16C shows the positioning of the threaded collars 106C on the leadscrews 106A prior to installation of the intermediate ring 104. Once the intermediate ring 104 is located over the adapter base and the threaded collars are rotated to obtain the desired axial position of the intermediate ring 104, the jam nuts 106B shown in FIG. 16D are tightened onto the ends of the lead screws 106A which protrude through the threaded collars 106C, thereby locking the axial position of the threaded collars 106C and the intermediate ring 104 relative to the adapter based 56 and hub 2.

Figure 16E:
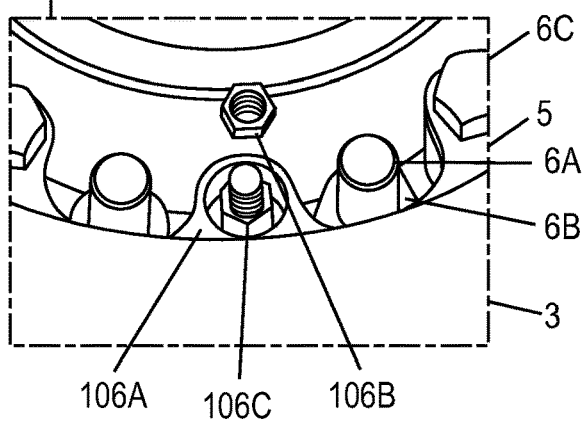
Figure 16F:
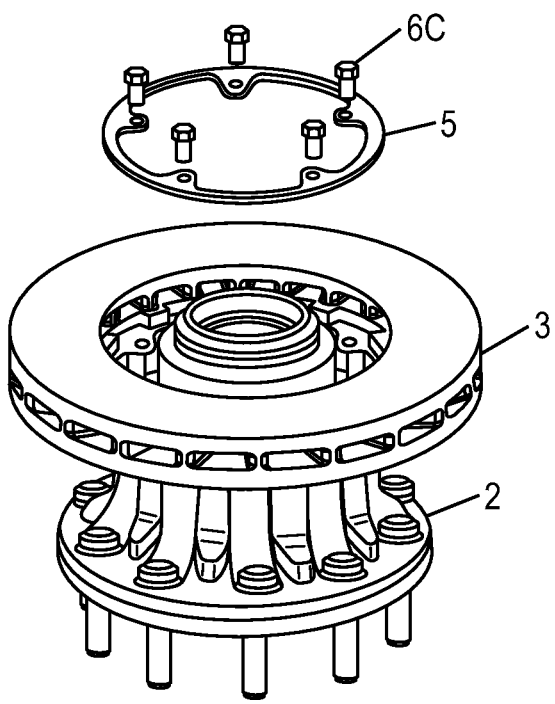
Figure 16G:
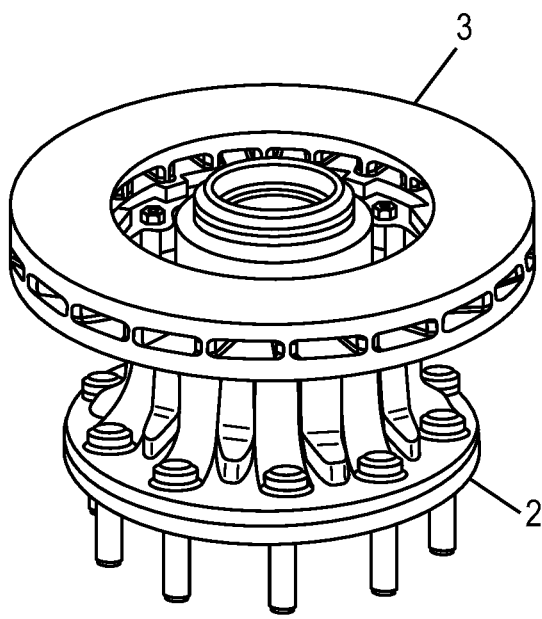
Figure 16H:
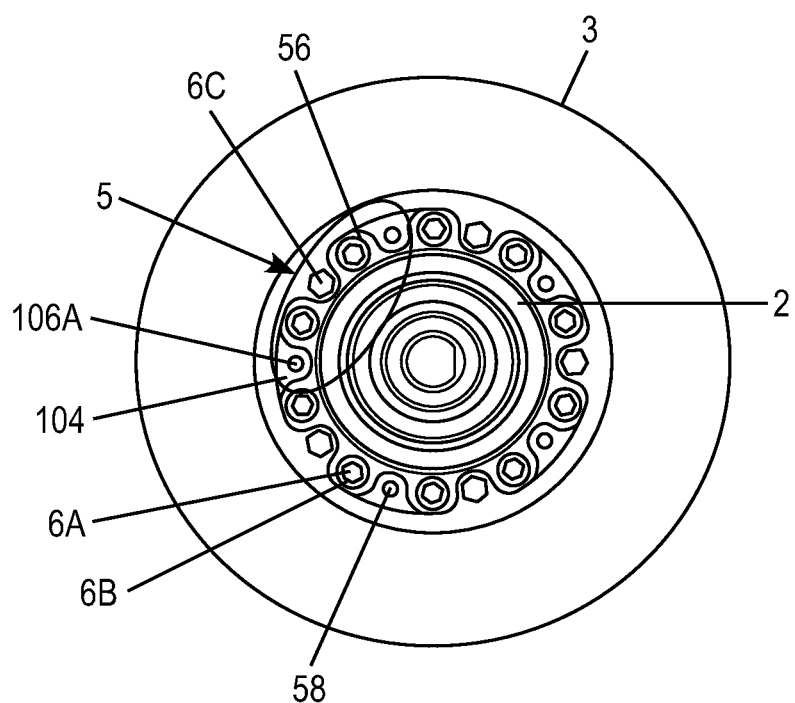

Following the tightening of the jam nuts 106B, the brake rotor 3, such as the envisioned "universal" or common brake rotor shown in FIG. 16E, may be installed on the intermediate ring 104 and axially retained by retaining ring 5 and hex bolts 6C, as shown in FIGS. 16F-16G. An advantage of this embodiment is illustrated in FIG. 17, which shows an elevation view of this embodiment of the present invention looking axially toward the hub 2. In this arrangement, the brake rotor 3 and intermediate ring 104 may be sized such that all of the fasteners may be readily accessed without interference from immediately radially-adjacent interferences. This permits the components of the brake mounting arrangement to be assembled and disassembled, partially or entirely, in any order required to service the brake. For example, if a stud 6A needs to be replaced on a brake whose intermediate ring 104 has already been adjusted with the threaded collars 106C to obtain the desired axial position of brake rotor 3, the fasteners 6B may be removed so that the entire assembly of the adapter base 56, intermediate ring 104 and brake rotor 3 may be removed as a module from the hub studs 6A. Following repair of the damaged stud 6A, the entire module may be reinstalled in a simple and cost-effective manner.

FIGS. 17A-17B show cross-section views of the FIGS. 15 and 16A-16H embodiment. In particular, FIG. 17 is an enlarged view of the arrangements of one of the leadscrews 106A. Here, the head of the leadscrew 106A is press-fitted into a recess of the adapter base 56. The threaded collar 106C is installed on the threads of the leadscrew 106A to the desired axial height above the axially-outer face of the adapter base 56, and receives the intermediate ring 104. A jam nut 106B locks the threaded collar 106C at the desired axial position. A counter bore in the intermediate ring 104 provides sufficient radial clearance to permit a tool, such as a socket, to be used to tighten the jam nut. Radial clearance is also provided between the end of the leadscrew 106A protruding up to retaining ring 5. The retaining ring 5 is separately retained on the keys of the intermediate ring 104 by the fasteners 6C, one of which is shown out of the plane of the FIG. 17B cross-section.

A method of assembly of the brake disc arrangement of FIG. 15 generally follows the assembly shown in FIGS. 16A-16H. One of ordinary skill in the art will recognize that several of the acts in the method may be performed in a different order. For example, the adjustment of the axial position of the threaded collars 106C on the leadscrews 106A, followed by tightening of the jam nuts 106B, may be performed after the brake disc arrangement is in an installed position on an axle hub, such that the axial position of the brake rotor 3 may be fine-tuned to match the actual axial position of the brake's caliper and brake pads.

The foregoing embodiment of the present invention is not limited to arrangements in which the brake disc mounting adapter is retained on the threaded collars separate from the retention of the retaining ring on the brake disc mounting adapter. For example, the retaining fasteners may be configured to both retain the retaining ring and serve the function of the jam nuts to axially fix the position of the threaded collars on the leadscrews.

The foregoing disclosure has been set forth merely to illustrate the invention and is not intended to be limiting. For example, an axle hub may be provided with key ring adapter-receiving surfaces that are axially inboard of the outboard-most face of the hub (i.e., some portion of the hub may protrude through the center of the key ring), as long as the key ring and brake disc are mountable on the hub. Since modifications of the disclosed embodiments incorporating the spirit and substance of the invention may occur to persons skilled in the art, the invention should be construed to include everything within the scope of the appended claims and equivalents thereof.

LISTING OF REFERENCE LABELS

1 brake disc mounting arrangement
2 axle hub
3 brake disc
3A wedge-shaped slot
3B lateral side
3C radially inner surface
3D radiused region
3E brake disc teeth
4 key ring
4A key
4B inter-key web
4C hole
4D lateral side
4E radially outer surface
4F radiused region
4G protruding end
4H scalloped region
5 retaining ring
6A retaining stud
6B retaining member
7A spring element
7B fastener
8 brake disc
10 wheel end arrangement
11 axle
12 bearing
13 wheel mounting stud
14 brake disc
14A rotor portion
14B rotor hat
15 torque plate
16 brake flange
17 torque plate offset
18 flange offset
19 hub offset
20 brake disc offset
21 hub drum-shaped portion
33 brake disc 33A, 33B, 33C wedge-shaped slot
33D, 33E, 33F shell
34 key ring
34A key
34C hole
35 fastener
43 brake disc
43A wedge-shaped slot
44 key ring
44A key
44B alignment rib
45 hub adapter
45A end face
45B alignment slot
46 brake pad
52 external threads
53 internal threads
54 locknut
55 collar
56 adapter base
58 pin
104 adjustable intermediate ring
106A leadscrew
106B jam nut
106C threaded collar

What is claimed is:

1. A brake disc mounting arrangement, comprising:
an axle hub having a rotation axis and at least one of hub-mounted fasteners and fastener-receiving apertures;
a brake disc mounting adapter configured to cooperate with the at least one of hub-mounted fasteners and fastener-receiving apertures to locate the brake disc mounting adapter on the axle hub, the brake disc mounting adapter including a plurality of wedge-shaped brake disc mounting keys;
a brake disc having a plurality of wedge-shaped slots circumferentially around a radially inner region of the brake disc, the wedge-shaped slots being configured to be received on corresponding ones of the brake disc mounting adapter keys when the brake disc is in an installed position on the axle hub;
a brake disc retainer; and
retaining fasteners configured to cooperate with the brake disc retainer and at least one of the brake disc mounting adapter and the at least one of hub-mounted fasteners and fastener-receiving apertures to axially retain the brake disc on the brake disc mounting adapter,
wherein
the brake disc mounting adapter is a key ring with the plurality of wedge-shaped brake disc mounting keys connected by inter-key webs between adjacent ones of the plurality of keys, all of the inter-key webs being located in a plane perpendicular to the rotation axis at a hub-facing side of the brake disc, and
the plurality of wedge-shaped brake disc mounting keys have an axial thickness which extends across a central region of respective ones of the plurality of brake disc wedge-shaped slots.

2. The brake disc mounting arrangement of claim 1, wherein
the at least one of hub-mounted fasteners and fastener-receiving apertures are studs, and
each of the plurality of keys includes an aperture configured to receive one of the studs when the key ring is in an installed position on the axle hub.

3. The brake disc mounting arrangement of claim 2, wherein
the retaining fasteners are nuts configured to thread onto the studs, and
when in an installed position on the studs, the nuts bias the brake disc mounting adapter against at least one brake disc mounting surface of the hub.

4. The brake disc mounting arrangement of claim 3, wherein
an axial thickness of the plurality of keys is greater than an axial thickness of the brake disc between the plurality of slots, and
the brake disc is axially displaceable between the brake disc retainer and the key ring inter-key webs.

5. The brake disc mounting arrangement of claim 4, wherein
the plurality of keys and the plurality of wedge-shaped slots are configured to expand and contract in response to temperature changes in a manner such that the plurality of keys do not bind the brake disc against radial expansion and contraction.

6. The brake disc mounting arrangement of claim 5, wherein
opposing circumferentially lateral faces of the plurality of keys and the plurality of wedge-shaped slots are aligned substantially parallel to radii extending outward from a rotation axis of the brake disc.

7. The brake disc mounting arrangement of claim 6, wherein
the opposing circumferentially lateral faces are arranged at an angle relative to the radii of 12° to 20°.

8. The brake disc mounting arrangement of claim 7, wherein
the angle is 16° to 18°.

9. The brake disc mounting arrangement of claim 5, wherein
opposing circumferentially lateral faces of the plurality of keys and the plurality of wedge-shaped slots are aligned relative to radii extending outward from a rotation axis of the brake disc such that a ratio of a loading on one of the plurality of keys having a highest loading during a braking event compared to a loading on another one of the plurality of keys having a lowest loading during a braking event is less than 2:1.

10. The brake disc mounting arrangement of claim 2, wherein
the retaining fasteners are nuts with flanged sections configured to thread onto the studs, and
when in an installed position on the studs, the nuts bias the brake disc mounting adapter against at least one brake disc mounting surface of the hub.

11. The brake disc mounting arrangement of claim 1, wherein
an axial thickness of the plurality of keys is greater than an axial thickness of the brake disc teeth, and
the brake disc is axially displaceable between the brake disc retainer and the key ring inter-key webs.

12. The brake disc mounting arrangement of claim 11, wherein
opposing circumferentially lateral faces of the plurality of keys and the plurality of wedge-shaped slots are aligned relative to radii extending outward from a rotation axis of the brake disc such that a loading on each of the plurality of keys during a braking event is between 4% and 17% of the total load on all of the keys.

13. The brake disc mounting arrangement of claim 1, wherein
 a ratio of a loading on one of the plurality of keys having a highest loading during a braking event compared to a loading on another one of the plurality of keys having a lowest loading during a braking event is less than 2:1.

14. The brake disc mounting arrangement of claim 1, wherein
 no shim or spring hardware is present between opposing circumferentially lateral faces of the plurality of keys and the plurality of wedge-shaped slots.

15. The brake disc mounting arrangement of claim 1, wherein
 a loading on each of the plurality of keys during a braking event is between 4% and 17% of the total load on all of the keys.

16. A brake disc mounting arrangement, comprising:
 a brake disc mounting adapter configured to be located on an axle hub and to cooperate with at least one of hub-mounted fasteners and fastener-receiving apertures to locate the brake disc mounting adapter on the axle hub, the brake disc mounting adapter including a plurality of wedge-shaped brake disc mounting keys;
 a brake disc having a plurality of wedge-shaped slots circumferentially around a radially inner region of the brake disc, the wedge-shaped slots being configured to be received on corresponding ones of the brake disc mounting adapter keys when the brake disc is in an installed position on the axle hub;
 a brake disc retainer; and
 retaining fasteners configured to cooperate with the brake disc retainer and at least one of the brake disc mounting adapter and the at least one of hub-mounted fasteners and fastener-receiving apertures to axially retain the brake disc on the brake disc mounting adapter,
 wherein
  the brake disc mounting adapter is a key ring with the plurality of wedge-shaped brake disc mounting keys connected by inter-key webs between adjacent ones of the plurality of keys, all of the inter-key webs being located axially in a plane perpendicular to the rotation axis, the plane being at a hub-facing side of the brake disc, and
 the plurality of wedge-shaped brake disc mounting keys have an axial thickness which extends across a central region of respective ones of the plurality of brake disc wedge-shaped slots.

17. The brake disc mounting arrangement of claim 16, wherein
 the at least one of hub-mounted fasteners and fastener-receiving apertures are studs, and
 each of the plurality of keys includes an aperture configured to receive one of the studs when the key ring is in an installed position on the axle hub.

18. The brake disc mounting arrangement of claim 17, wherein
 the retaining fasteners are nuts configured to thread onto the studs, and
 when in an installed position on the studs, the nuts bias the brake disc mounting adapter against at least one brake disc mounting surface of the hub.

19. The brake disc mounting arrangement of claim 18, wherein
 an axial thickness of the plurality of keys is greater than an axial thickness of the brake disc between the plurality of slots, and
 the brake disc is axially displaceable between the brake disc retainer and the key ring inter-key webs.

20. The brake disc mounting arrangement of claim 19, wherein
 the plurality of keys and the plurality of wedge-shaped slots are configured to expand and contract in response to temperature changes in a manner such that the plurality of keys does not bind the brake disc against radial expansion and contraction.

21. The brake disc mounting arrangement of claim 20, wherein
 opposing circumferentially lateral faces of the plurality of keys and the plurality of wedge-shaped slots are aligned substantially parallel to radii extending outward from a rotation axis of the brake disc.

22. The brake disc mounting arrangement of claim 20, wherein
 opposing circumferentially lateral faces of the plurality of keys and the plurality of wedge-shaped slots are aligned relative to radii extending outward from a rotation axis of the brake disc such that a loading on each of the plurality of keys during a braking event is between 4% and 17% of the total load on all of the keys.

23. The brake disc mounting arrangement of claim 16, wherein
 the retaining fasteners are bolts configured to thread into apertures in the brake disc mounting adapter keys,
 the brake disc mounting adapter inter-key webs include apertures configured to receive the at least one of hub-mounted fasteners and fasteners configured to be received in the fastener-receiving apertures of the axle hub, and
 when in an installed position inter-key webs are biased against at least one brake disc mounting surface of the hub.

24. The brake disc mounting arrangement of claim 23, wherein
 an axial thickness of the plurality of keys is greater than an axial thickness of the brake disc teeth, and
 the brake disc is axially displaceable between the brake disc retainer and the key ring inter-key webs.

25. The brake disc mounting arrangement of claim 24, wherein
 the opposing circumferentially lateral faces are arranged at an angle relative to the radii of 12° to 20°.

26. The brake disc mounting arrangement of claim 25, wherein
 the angle is 16° to 18°.

27. The brake disc mounting arrangement of claim 16, wherein
 a ratio of a loading on one of the plurality of keys having a highest loading during a braking event compared to a loading on another one of the plurality of keys having a lowest loading during a braking event is less than 2:1.

28. The brake disc mounting arrangement of claim 16, wherein
 no shim or spring hardware is present between opposing circumferentially lateral faces of the plurality of keys and the plurality of wedge-shaped slots.

29. The brake disc mounting arrangement of claim 16, wherein
 a loading on each of the plurality of keys during a braking event is between 4% and 17% of the total load on all of the keys.

* * * * *